(12) United States Patent
Nguyen et al.

(10) Patent No.: US 8,095,971 B2
(45) Date of Patent: Jan. 10, 2012

(54) UNIVERSAL SERIAL BUS (USB) FLASH DRIVE HAVING LOCKING PINS AND LOCKING GROOVES FOR LOCKING SWIVEL CAP

(75) Inventors: David Nguyen, San Jose, CA (US); Nan Nan, San Jose, CA (US); I-Kang Yu, Palo Alto, CA (US); Jim Chin-Nan Ni, San Jose, CA (US); Ming-Shiang Shen, Taipei Hsien (TW)

(73) Assignee: SuperTalent Electronics, Inc., San Jose, CA (US)

( * ) Notice: Subject to any disclaimer, the term of this patent is extended or adjusted under 35 U.S.C. 154(b) by 1060 days.

(21) Appl. No.: 11/929,857

(22) Filed: Oct. 30, 2007

(65) Prior Publication Data
US 2008/0276099 A1    Nov. 6, 2008

Related U.S. Application Data

(63) Continuation-in-part of application No. 09/478,720, filed on Jan. 6, 2000, now Pat. No. 7,257,714, which is a continuation-in-part of application No. 09/366,976, filed on Aug. 4, 1999, now Pat. No. 6,547,130, application No. 11/929,857, which is a continuation-in-part of application No. 11/309,594, filed on Aug. 28, 2006, now Pat. No. 7,338,362, which is a continuation-in-part of application No. 10/707,277, filed on Dec. 2, 2003, now Pat. No. 7,103,684, application No. 11/929,857, which is a continuation-in-part of application No. 11/257,575, filed on Oct. 24, 2005, now Pat. No. 7,249,978.

(51) Int. Cl.
*H04L 9/00* (2006.01)

(52) U.S. Cl. .............................. 726/9; 439/660; 713/186

(58) Field of Classification Search .................. 713/167, 713/185, 186, 189, 193; 726/9; 439/76.1, 439/660, 135; 361/752
See application file for complete search history.

(56) References Cited

U.S. PATENT DOCUMENTS

| | | | |
|---|---|---|---|
| 6,125,192 A * | 9/2000 | Bjorn et al. | 382/124 |
| 7,165,998 B2 * | 1/2007 | Lee et al. | 439/660 |
| 7,359,208 B2 * | 4/2008 | Ni | 361/752 |
| 7,407,390 B1 * | 8/2008 | Ni | 439/76.1 |
| 7,407,393 B2 | 8/2008 | Ni et al. | |
| 7,420,803 B2 | 9/2008 | Hsueh et al. | |

(Continued)

*Primary Examiner* — Beemnet Dada
(74) *Attorney, Agent, or Firm* — Maryam Imam; IPxLaw Group LLP

(57) ABSTRACT

In one embodiment of the present invention a Universal Serial Bus (USB) flash drive with locking swivel cap includes a USB device, a swivel cap having a top swivel cap face and a bottom swivel cap face. The swivel cap is connectably attached to the USB device, four locking pins, two of which disposed on the top swivel cap face and two of which disposed on the bottom swivel cap face, two top locking grooves disposed on a top surface of the USB device, and two bottom locking grooves disposed on a bottom surface of the USB device, wherein the locking pins disposed on top swivel cap face coupled with the two top locking grooves and the locking pins disposed on the bottom swivel cap face couple with the two bottom locking grooves allowing the swivel cap to lock in fully open (180 degrees) and fully closed (0 degree). A USB connector is connected to the USB device to couple the USB flash drive to a host device. A fingerprint sensor area is disposed on the top side of the USB device, the fingerprint sensor scans fingerprints of a user of the portable flash drive with swivel cap and optional fingerprint verification capability, and allowing access to data stored on the portable flash drive with swivel cap and optional fingerprint verification capability.

13 Claims, 17 Drawing Sheets

U.S. PATENT DOCUMENTS

| | | | |
|---|---|---|---|
| 7,503,780 B1 * | 3/2009 | Huang | 439/135 |
| 7,537,488 B2 * | 5/2009 | Iwakawa | 439/660 |
| 7,824,227 B1 * | 11/2010 | Lee et al. | 439/660 |
| 2008/0019090 A1 * | 1/2008 | Zhu et al. | 361/684 |

* cited by examiner

UNIVERSAL SERIAL BUS (USB) FLASH DRIVE HAVING LOCKING PINS AND LOCKING GROOVES FOR LOCKING SWIVEL CAP

CROSS REFERENCE TO RELATED APPLICATIONS

This application is a continuation in part (CIP) of U.S. patent application Ser. No. 09/478,720, entitled "Electronic Data Storage Medium with Fingerprint Verification Capability", filed Jan. 6, 2000, which claims CIP benefit to U.S. patent application Ser. No. 09/366,976, entitled "Integrated Circuit Card with Fingerprint Verification Capability", filed Aug. 4, 1999, now issued as U.S. Pat. No. 6,547,130.

This application is further a CIP of a U.S. patent application Ser. No. 11/309,594, entitled "Single-Chip Multi-Media Card/Secure Digital (MMC/SD) Controller Reading Power-On Boot Code from integrated Flash Memory for User Storage", filed on Aug. 28, 2006, which is a CIP of U.S. patent application Ser. No. 10/707,277, entitled "Single-Chip USB Controller Reading Power-On Boot Code from Integrated Flash Memory For User Storage", filed on Dec. 2, 2003. This application is a CIP of U.S. patent application Ser. No. 11/257,575 entitled "Reduced-Length, Low profile USB Device and Card-Like Carrier" and filed on Oct. 24, 2005. This application relates to U.S. Pat. No. 7,004,780, filed May 13, 2004, and entitled "Portable Computer Peripheral Apparatus with Retractable Plug Connector", which is incorporated herein by reference as though set in full.

BACKGROUND OF THE INVENTION

1. Field of the Invention

The present invention relates generally to the field of portable flash drives and particularly to portable drives with swivel caps and optional fingerprint verification capability and methods for manufacturing thereof.

2. Description of the Prior Art

As computers have gained enormous popularity in recent decades, so has the need for better and more efficient ways of storing memory. Notable among memory devices are the portable ones that may be carried around by the user to access computers at different locations. This is particularly common in the case of personal computers (PC) where the need often arises to transfer data from one PC to another. Examples of portable memory devices include nonvolatile memory devices such as a universal serial bus (USB) flash drive that is removably connectible to a computer.

Universal serial bus (USB) flash drives are available in various shapes and forms. The USB flash drive needs a USB connector to be coupled to a USB port of a host device such as a PC. The USB flash drive generally has a metal casing and a cover which is screwed in or otherwise attached to the casing. To access the USB connector the user needs to open the metal cover and put it back on the casing after finishing the work with the USB flash drive. The shape of the casing and cover may be in the form of a pen or some other configuration.

However, use of the metallic parts such as the casing and the cover generally results in a heavy USB flash drive, which is not very convenient to carry. The dimensions of the casing and cover are often large resulting in a long USB flash drive, which is another impediment to easy carriage of the unit. In addition, once the cover is removed, it may be lost or forgotten and not be replaced.

It is therefore desirable to design and develop a USB flash drive with a relatively short and compact configuration that is light and may therefore be easily carried around by the user. In particular, packaging style and shape of the portable USB flash drive may be improved to generate additional interest and enthusiasm in using the device. In addition, the desired USB flash drive should not incur substantial cost of manufacturing but should rather improve the manufacturing and assembly process over the existing USB flash drives with metallic components.

Another consideration is protection of sensitive materials stored in a portable, removable memory drive. Specifically, it is not uncommon for a user of such a drive to store thereon sensitive or private information. If the drive is lost, misplaced, or stolen, it is often desirable to have a mechanism to prevent, or at least impede, unauthorized users from accessing data stored thereon.

In light of the foregoing, an improved USB flash drive is needed.

SUMMARY OF THE INVENTION

Briefly, an embodiment of the present invention includes a Universal Serial Bus (USB) flash drive with locking swivel cap having a USB device, a swivel cap having a top swivel cap face and a bottom swivel cap face. The swivel cap is connectably attached to the USB device, four locking pins, two of which disposed on the top swivel cap face and two of which disposed on the bottom swivel cap face, two top locking grooves disposed on a top surface of the USB device, and two bottom locking grooves disposed on a bottom surface of the USB device, wherein the locking pins disposed on top swivel cap face coupled with the two top locking grooves and the locking pins disposed on the bottom swivel cap face couple with the two bottom locking grooves allowing the swivel cap to lock in fully open (substantially 180 degrees) and fully closed (substantially 0 degree). A USB connector is connected to the USB device to couple the USB flash drive to a host device. A fingerprint sensor area is disposed on the top side of the USB device, the fingerprint sensor scans fingerprints of a user of the portable flash drive with swivel cap and optional fingerprint verification capability, and allowing access to data stored on the portable flash drive with swivel cap and optional fingerprint verification capability.

The foregoing and other objects, features and advantages of the present invention will be apparent from the following detailed description of the preferred embodiments which make reference to several figures of the drawing.

IN THE DRAWINGS

FIG. 1 shows a top angular view 134 of the USB flash drive with locking swivel cap 132 and a bottom angular view 136 of the USB flash drive with locking swivel cap 132 in accordance with one embodiment of the present invention.

FIG. 2 shows a top view 138 of the USB flash drive with locking swivel cap 132 shown in the open position and a top view 140 of the USB flash drive with locking swivel cap 132 shown in the closed position in accordance with one embodiment of the present invention.

FIG. 3 shows an exploded view 125 of a slim USB device 126 to include a transparent plastic end-cap 112, a slim USB housing 114, a printed circuit board assembly (PCBA) with fingerprint sensor 116, and a PCBA support 118 in accordance with an embodiment of the present invention.

Figure 7:
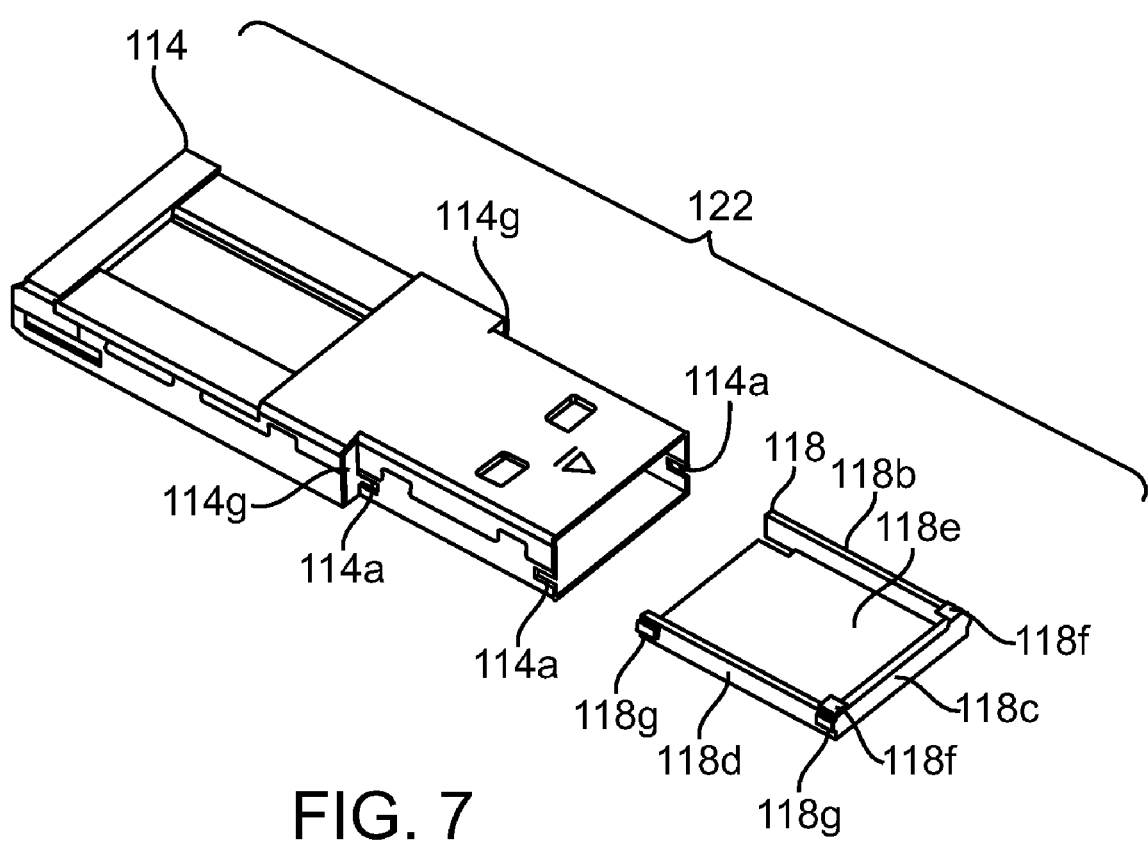

FIG. 7 shows a step in the manufacturing process where the PCB support 118 is inserted into the slim USB housing 114 to form the slim USB housing with PCB support 122.

Figure 8:
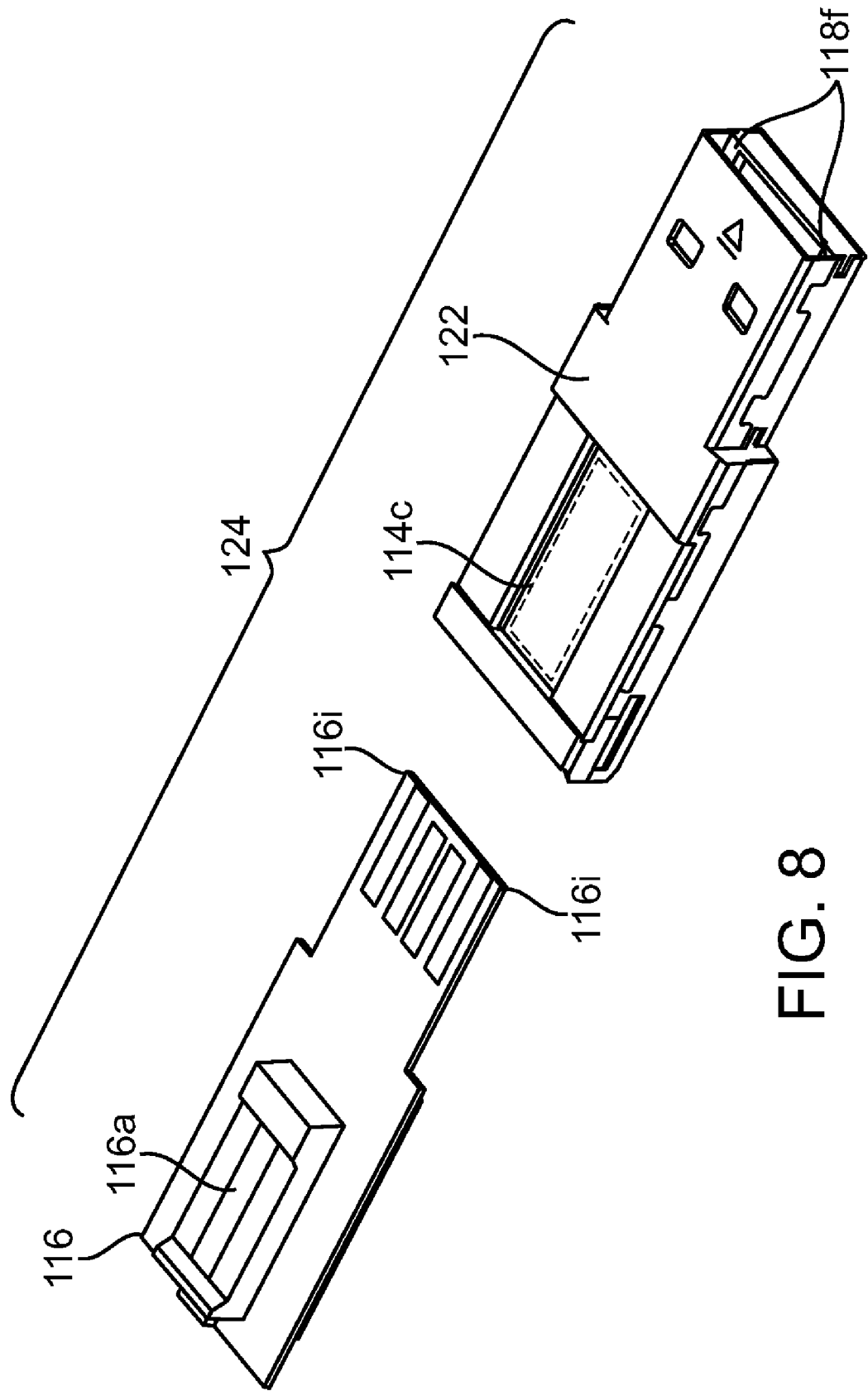

FIG. 8 shows a step in the manufacturing process where the PCBA 116 is inserted into the slim USB housing with PCB support 122 to form the slim USB housing with PCBA 124.

Figure 9:
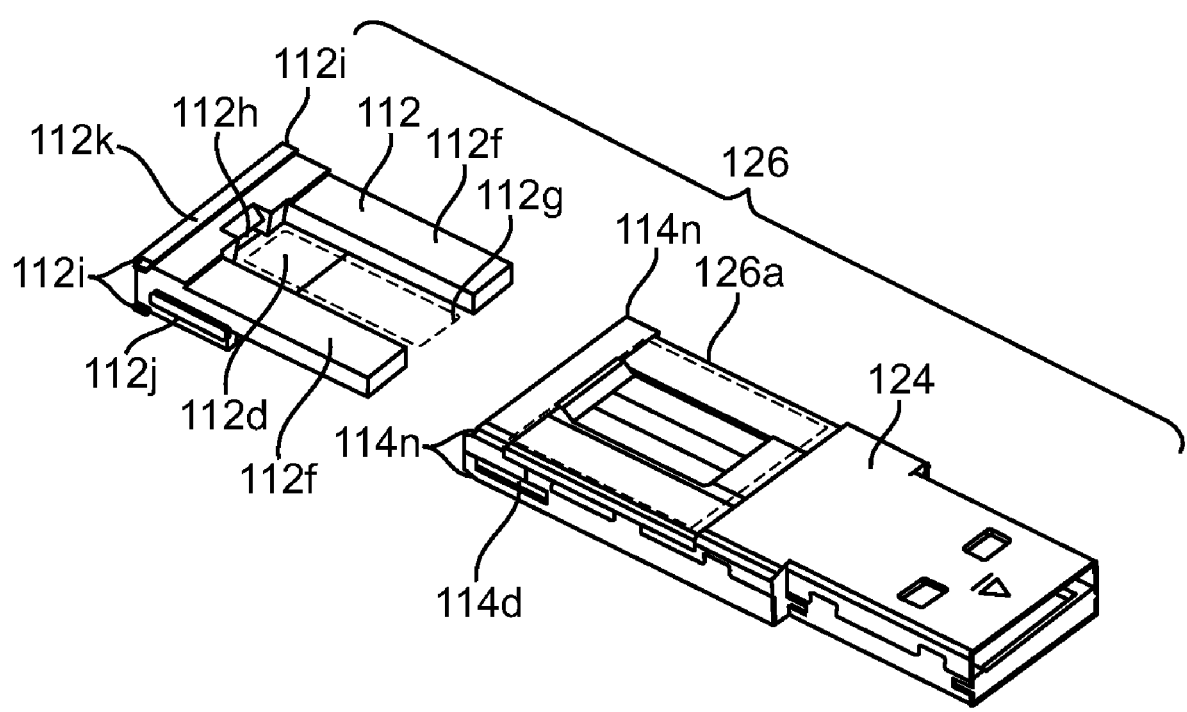

FIG. 9 shows a step in the manufacturing process where the transparent plastic end-cap 112 is inserted into the slim USB housing with PCBA 124 to form the slim USB device 126.

Figure 10:
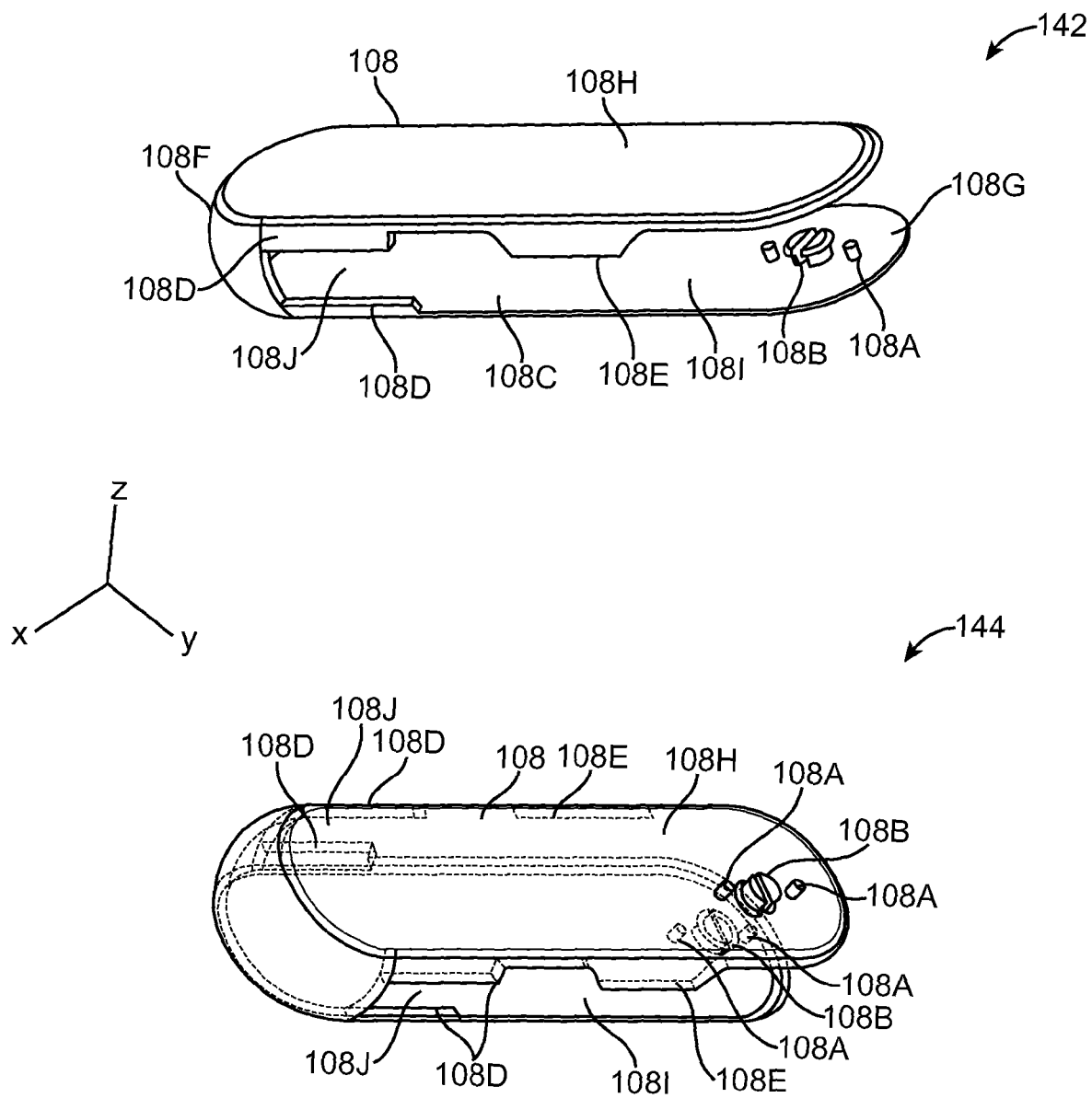

FIG. 10, a top angular view of the swivel cap 108, in accordance with an embodiment of the present invention, which piece is comprised of a transparent or translucent plastic material.

Figure 11:
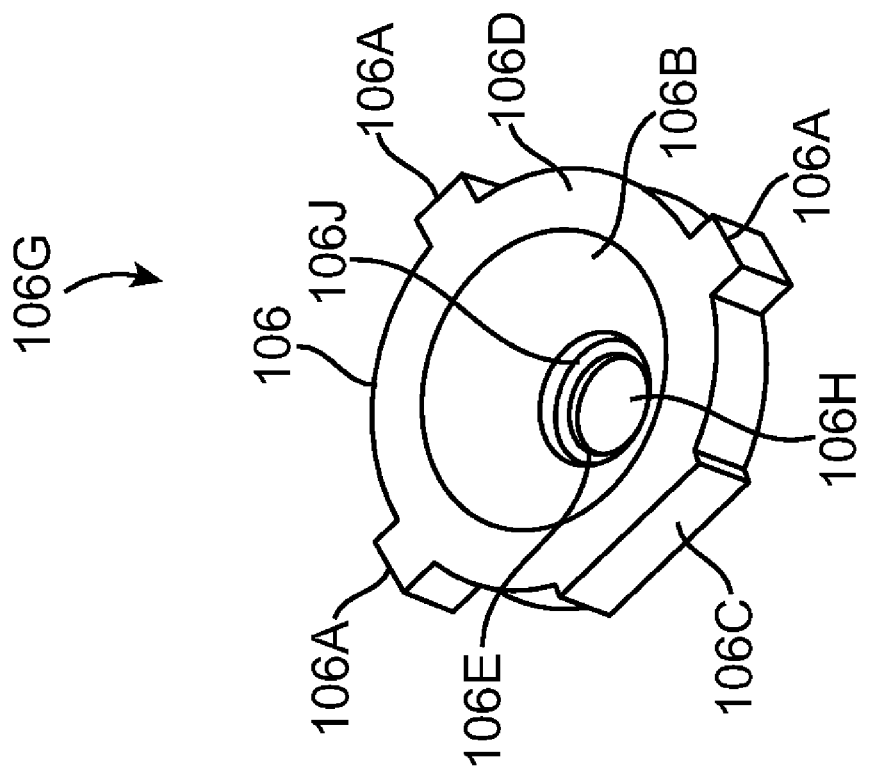
Figure 11:
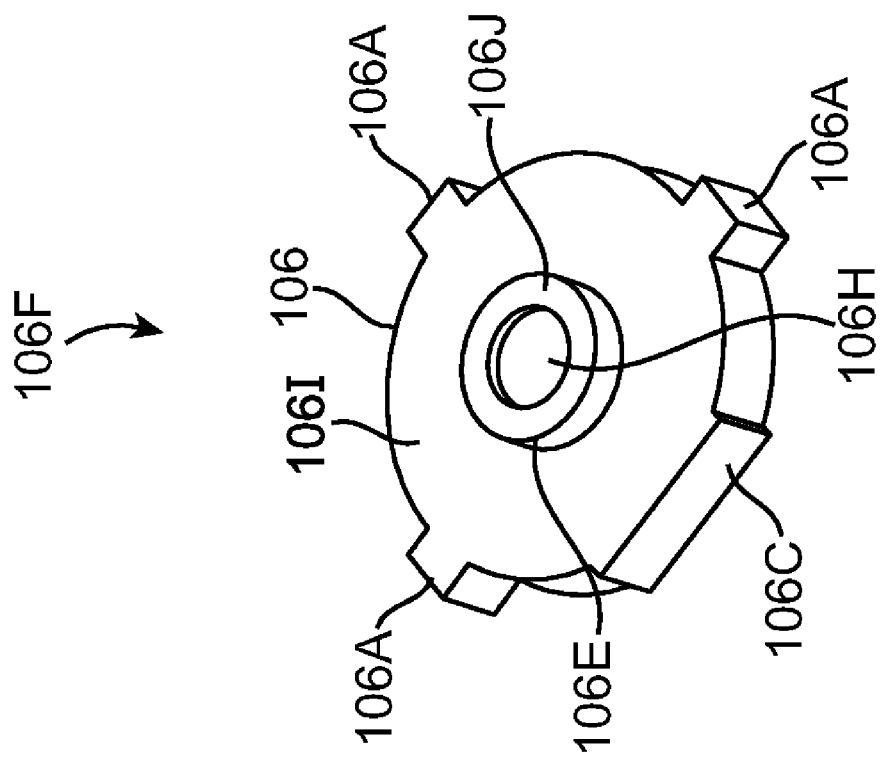

FIG. 11 shows a top angular view 106F of the pivot block 106 and a bottom angular view 106G of the pivot block 106 to include three pivot block end stops 106A, a pivot block slope 106B, pivot block fitting edge 106C, pivot block ventral face 106D, pivot block snap coupling 106E, snap coupling aperture 106H, pivot block dorsal face 106I; and a snap coupling lip 106J.

Figure 12:
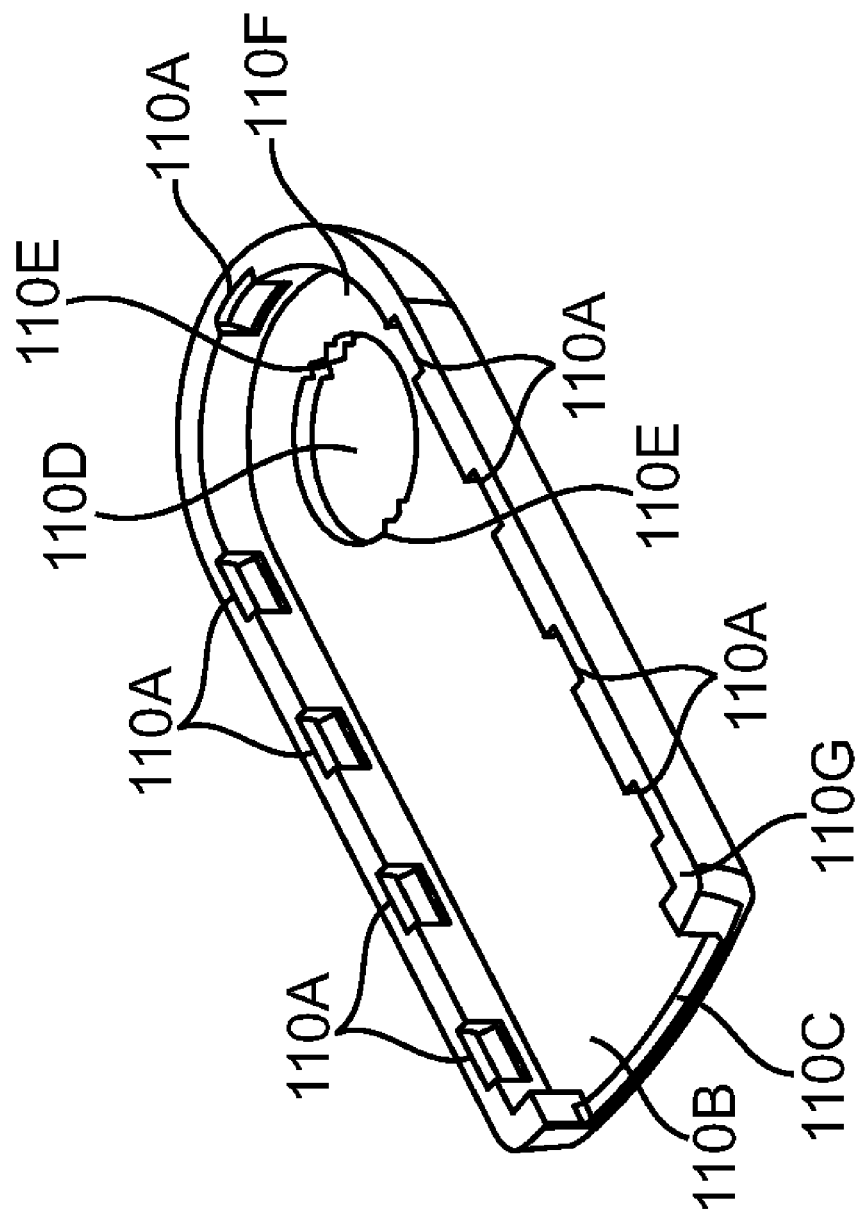
Figure 12:
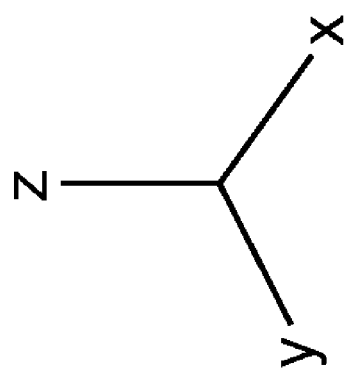

FIG. 12 shows a top angular view of the lower housing 110 to include nine snap coupling slots 110A, lower housing channel 110B, USB connector opening 110C, pivot block aperture 110D, two lock groove snap couplings 110E, semicircular shaped end 110F, and a lower housing lip 110G in accordance with an embodiment of the present invention.

Figure 13:
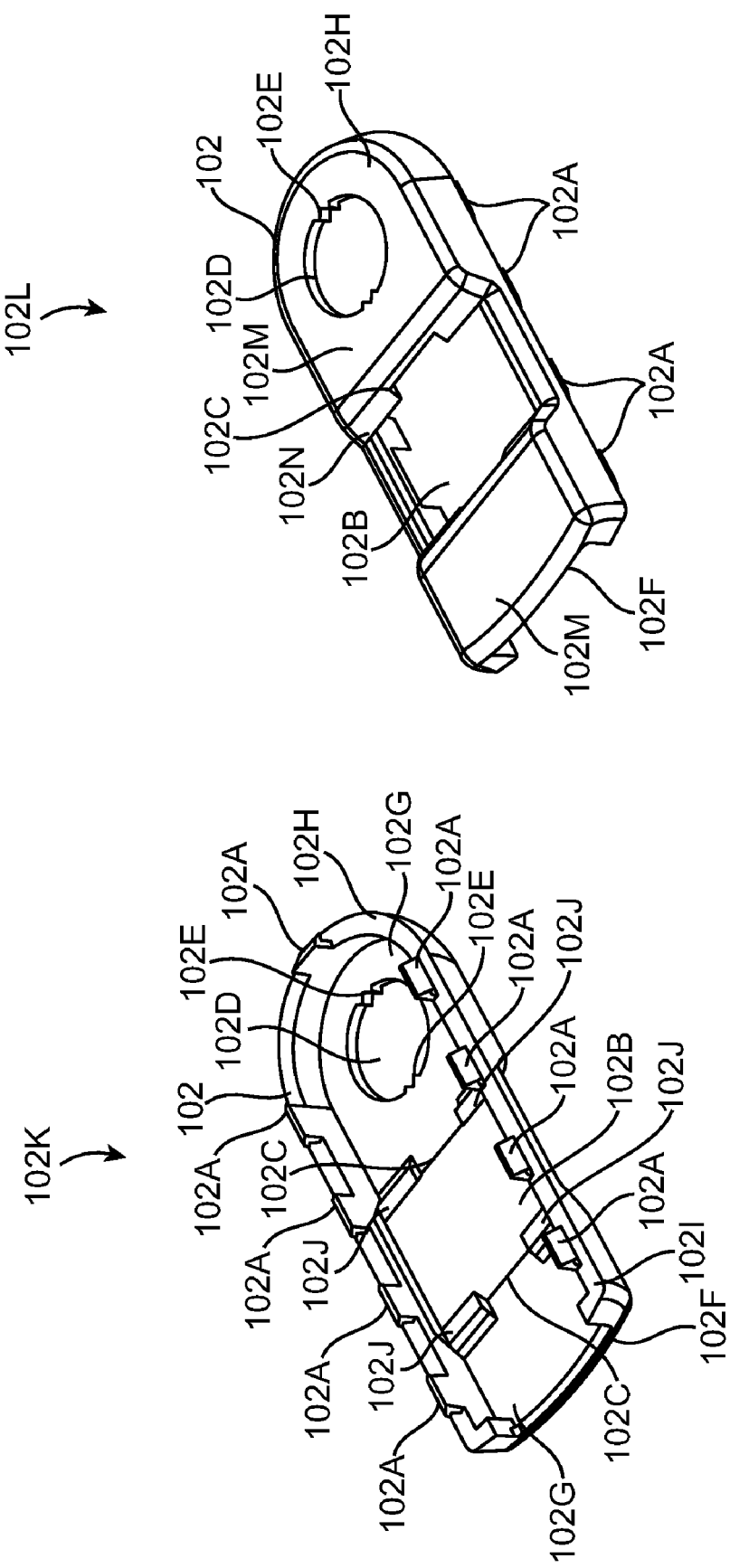

FIG. 13 shows a bottom angular view 102K of the upper housing 102 and a top angular view 102L of the upper housing 102 are shown in accordance with one embodiment of the present invention.

Figure 14:
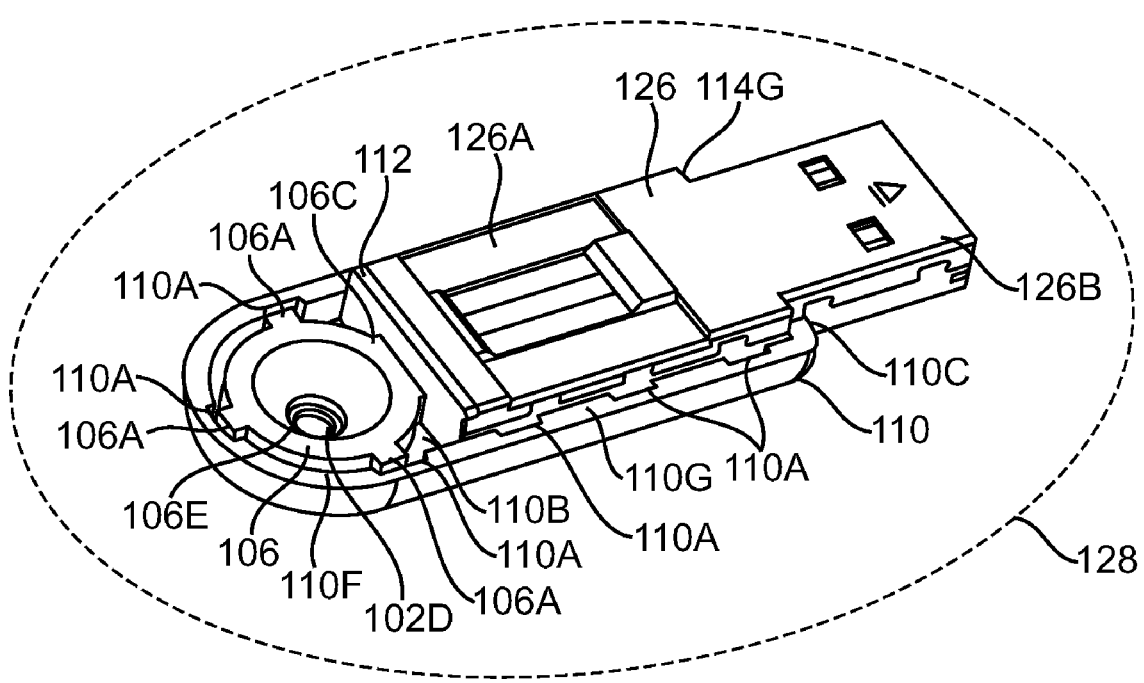

FIG. 14 shows a step in the manufacturing process where the partial USB device assembly 128 is formed by placing the slim USB device 126 and a pivot block 106 into the lower housing 110.

Figure 15:
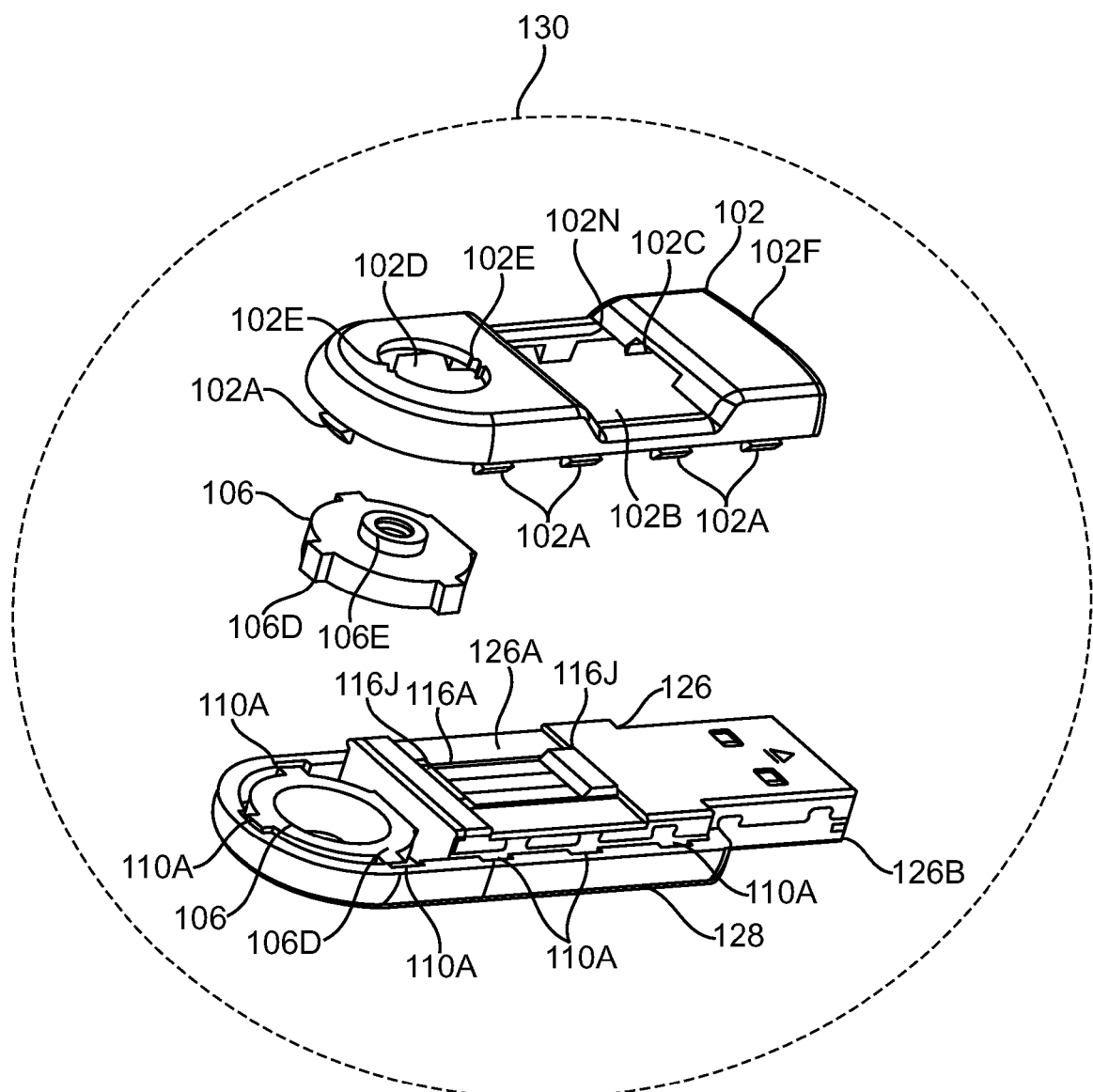

FIG. 15 shows a step in the manufacturing process where a top angular view of the USB Device 130 assembly is formed by placing a pivot block 106 into the partial USB device assembly 128 and connecting the upper housing 102 to the lower housing 110.

Figure 16:
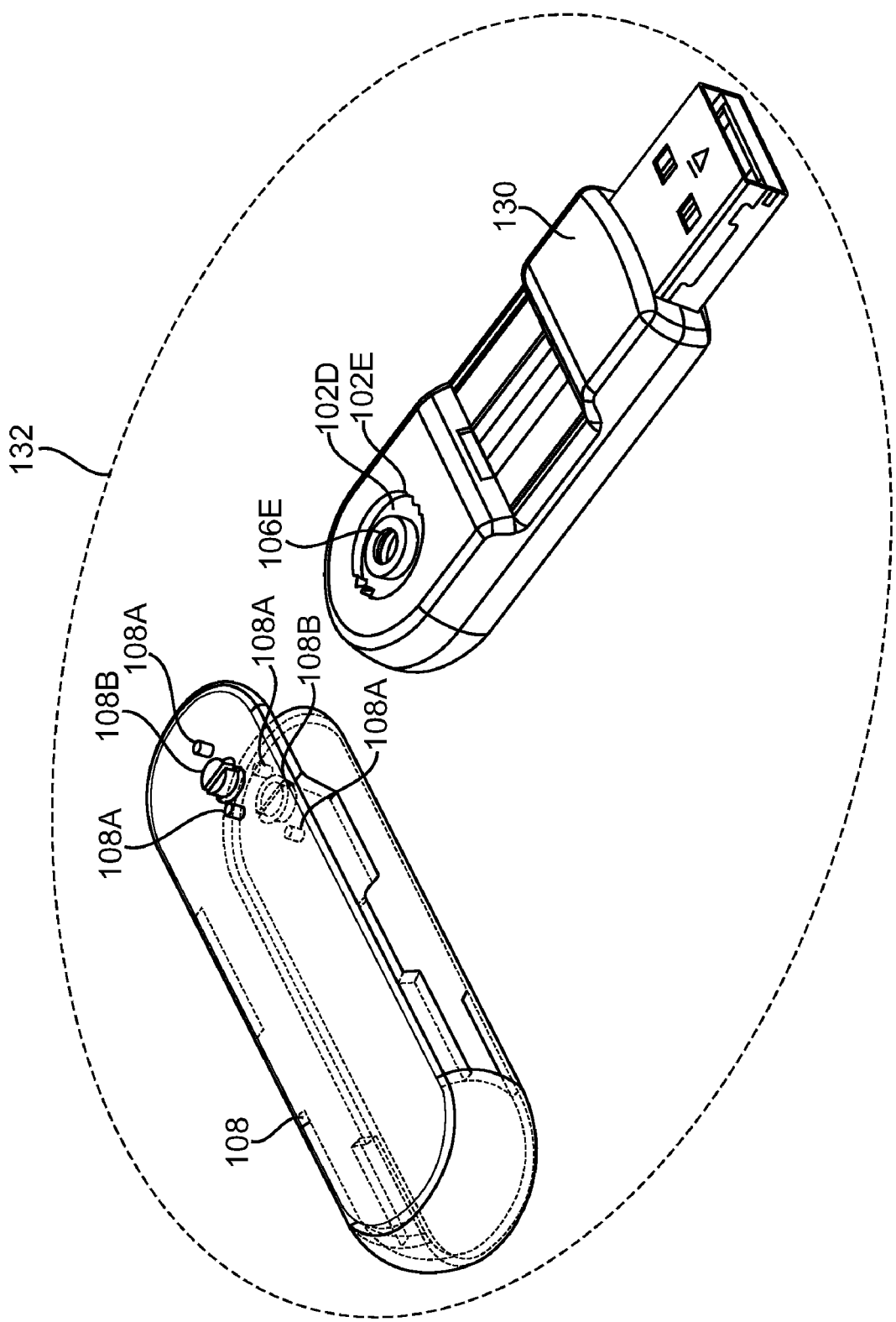

FIG. 16, shows a step in the manufacturing process where the USB Device with swivel cap assembly 132 is formed by affixing the sliding the swivel cap 108 onto the USB device 130.

Figure 17:
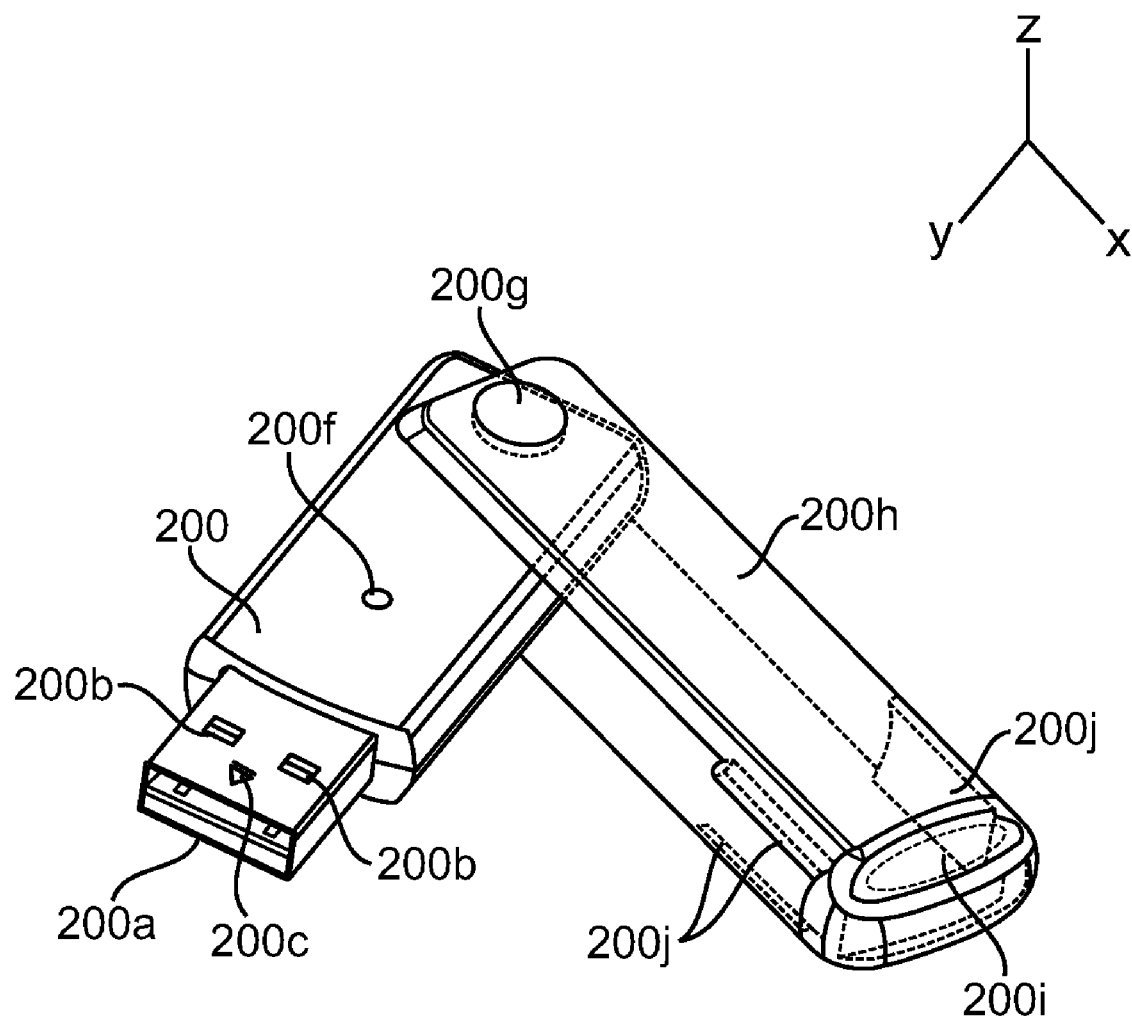

FIG. 17 shows an alternative embodiment, a USB storage device with one-way swiveling cap 200 is shown to include a USB connector 200a, an insertion indicator 200b, USB interface slots 200c, lower plastic housing 200d, upper plastic housing 200e, an LED 200f, a pivot 200g, a clear plastic swivel cap 200h, a lanyard hole 200i, and an opening in the plastic swivel cap 200j in accordance with an embodiment of the present invention.

DETAILED DESCRIPTION OF THE PREFERRED EMBODIMENT OF THE PRESENT INVENTIONS

Figure 1:
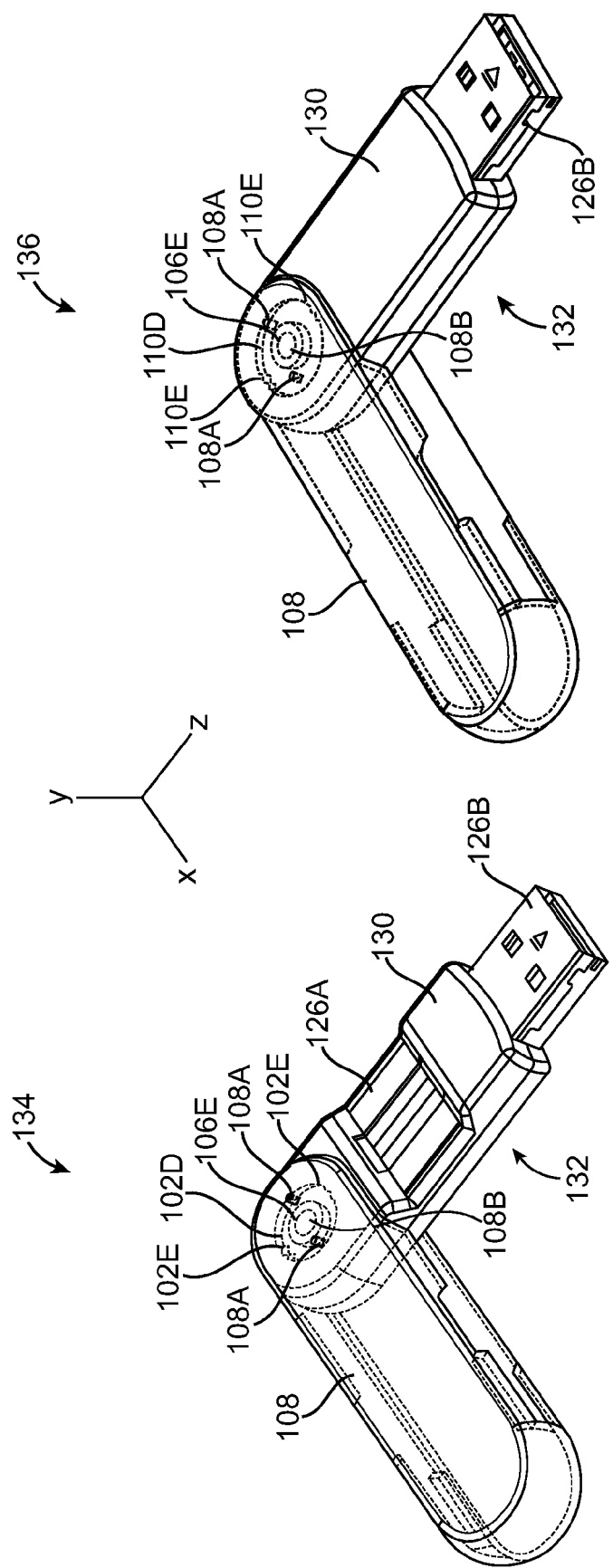

Referring now to FIG. 1, a top angular view 134 of the USB flash drive with locking swivel cap 132 and a bottom angular view 136 of the USB flash drive with locking swivel cap 132 are shown in accordance with one embodiment of the present invention. The USB flash drive with locking swivel cap 132 is shown to include a USB device 130; a swivel cap 108; four lock pins 108A; a pivot block aperture 102D; two lock groove snap couplings 102E; two pivot snap couplings 108B; two pivot block snap couplings 106E; a USB connector 126B; a fingerprint sensor area 126A; a pivot block aperture 110D; and two lock groove snap couplings 110E.

As shown in the top angular view 134, the USB device 130 has a USB connector 126B exposed on one end of the device, and the USB device is joined to the swivel cap 108 about the connection of the pivot snap coupling 108B to the pivot block snap coupling 106E. Two lock pins 108A rest within the pivot block aperture 102D. On the interior face of the pivot block aperture 102D two lock groove snap couplings 102E protrude. The lock groove snap couplings 102E generally protrude inward relative to the pivot block aperture 102D at an angle that is substantially 0 and 180 degrees about the y-axis. As shown in the bottom angular view 136, the USB device 130 is joined to the swivel cap 108 about the connection of the pivot snap coupling 108B to the pivot block snap coupling 106E. Two lock pins 108A rest within the pivot block aperture 110D. On the interior face of the pivot block aperture 110D two lock groove snap couplings 110E protrude. The lock groove snap couplings 110E generally protrude inward relative to the pivot block aperture 110D at an angle that is substantially 0 and 180 degrees about the y-axis. The fingerprint sensor area 126A is positioned generally about the center of the USB device 130.

The swivel cap 108 rotates axially about the pivot snap couplings 108B. The lock pins 108A rotate within the pivot block aperture 110D and pivot block aperture 102D, where the lock pins 108A lock into the lock groove snap couplings 102E and the lock groove snap couplings 110E at both a substantially 180 degree ("open position") and substantially 0 degree ("closed position") positions about the y-axis. That is, the lock pins 108A snapping into the lock groove snap couplings 102E and the lock groove snap couplings 110E when the swivel cap 108 is rotated serve to lock the USB flash drive with locking swivel cap 132 in the open or closed position. When the USB flash drive with locking swivel cap 132 is locked in the closed position, the USB device 130 is fully enclosed within the swivel cap 108 to protect the USB device 130 from physical damage. When the USB flash drive with locking swivel cap 132 is locked in the open position, the USB connector 126B and the fingerprint sensor area 126A are fully exposed for operation. In ordinary use, the swivel cap 108 and the USB device 130 are permanently attached to each other, preventing the swivel cap 108 from being misplaced.

Figure 2:
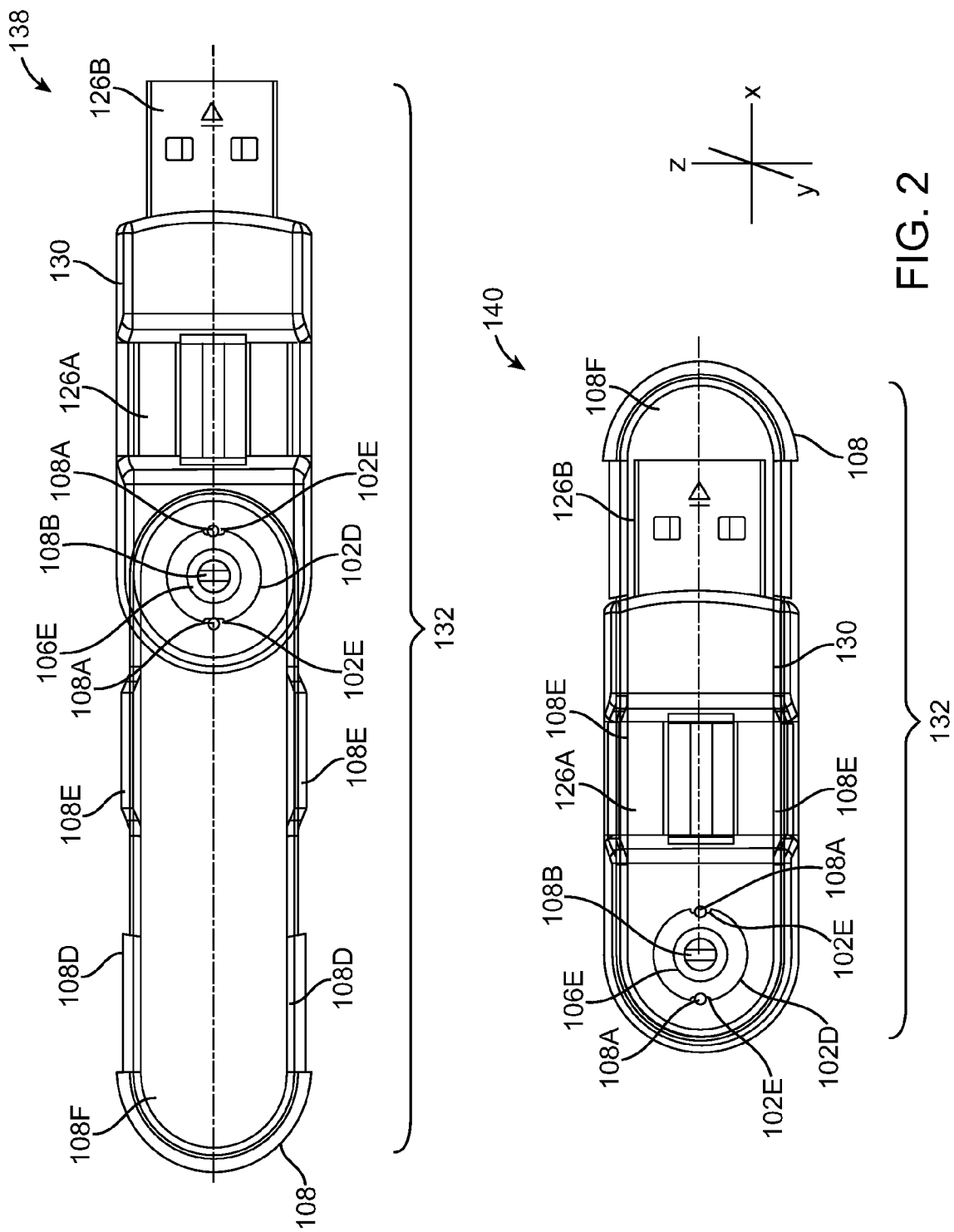

Referring now to FIG. 2, a top view 138 of the USB flash drive with locking swivel cap 132 in the open position and a top view 140 of the USB flash drive with locking swivel cap 132 in the closed position are shown in accordance with one embodiment of the present invention. The USB flash drive with locking swivel cap 132 is shown to include a USB device 130; USB connector 126B; a swivel cap 108; a pivot snap coupling 108B; two USB connector spacer lips 108D; two fingerprint sensor area spacer lips 108E; a closed semi-circular end cap 108F; two lock pins 108A; a pivot block aperture 102D; two lock groove snap couplings 102E; and a pivot block snap coupling 106E.

As shown in the top view 138, the USB device 130 is joined to the swivel cap 108 about the connection of the pivot snap coupling 108B to the pivot block snap coupling 106E. Two lock pins 108A rest within the pivot block aperture 102D. On the interior face of the pivot block aperture 102D two lock groove snap couplings 102E protrude. The lock groove snap couplings 102E generally protrude inward relative to the pivot block aperture 102D at an angle that is substantially 0 and 180 degrees about the y-axis. In the open position, the swivel cap 108 is rotated axially about the pivot snap coupling 108B to the open position, generally at 180 degrees. In this position, the lock pins 108A are coupled with the lock groove snap couplings 102E in the pivot block aperture 102D. The USB connector 126B and fingerprint sensor area 126A are exposed for operation.

As shown in the top view 140, the USB device 130 is joined to the swivel cap 108 about the connection of the pivot snap coupling 108B to the pivot block snap coupling 106E. Two lock pins 108A rest within the pivot block aperture 102D. On the interior face of the pivot block aperture 102D two lock groove snap couplings 102E protrude. The lock groove snap couplings 102E generally protrude inward relative to the pivot block aperture 102D at an angle that is substantially 0 and 180 degrees about the y-axis. In the open position, the swivel cap 108 is rotated axially about the pivot snap coupling 108B to the closed position, generally at 0 degrees. In this position, the lock pins 108A are coupled with the lock groove snap couplings 102E in the pivot block aperture 102D.

In the top view 140, the USB device 130 is enshrouded by the swivel cap 108, and the fingerprint sensor area spacer lips 108E and the USB connector spacer lips 108D occlude gaps in the lateral sides of the USB flash drive with locking swivel cap 132 in the closed position. The USB device 130 is of a shorter length than the swivel cap 108, with the leading edge of the USB connector 126B generally situated flush with the inward facing edge of the closed semi-circular end cap 108F of the swivel cap 108.

The swivel cap 108 rotates axially about the pivot snap couplings 108B. The lock pins 108A rotate within the pivot block aperture 110D and pivot block aperture 102D, where the lock pins 108A lock into the lock groove snap couplings 102E and the lock groove snap couplings 110E at both the open and closed positions about the y-axis. That is, the lock pins 108A snapping into the lock groove snap couplings 102E and the lock groove snap couplings 110E when the swivel cap 108 is rotated serve to lock the USB flash drive with locking swivel cap 132 in the open or closed position. When the USB flash drive with locking swivel cap 132 is locked in the closed position, the USB device 130 is fully enclosed within the swivel cap 108 to protect the USB device 130 from physical damage. The fingerprint sensor area spacer lips 108E and the USB connector spacer lips 108D occlude gaps in the lateral facings of the USB flash drive with locking swivel cap 132 while in the closed position, preventing damage and debris accumulation due to the intrusion of foreign matter into the area between the interior facing edge of the swivel cap 108 the fingerprint sensor area 126A and USB connector 126B respectively. When the USB flash drive with locking swivel cap 132 is locked in the open position, the USB connector 126B and the fingerprint sensor area 126A are fully exposed for operation. In ordinary use, the swivel cap 108 and the USB device 130 are permanently attached to each other, preventing the swivel cap 108 from being misplaced.

In one alternative embodiment of the invention, there is no fingerprint sensor area 126A on the USB device 130. In this embodiment, the swivel cap 108 does not have the fingerprint sensor area spacer lips 108E as there is no resulting gap in the side of the USB flash drive with locking swivel cap 132 in the closed position from the fingerprint sensor area 126A.

Figure 3:
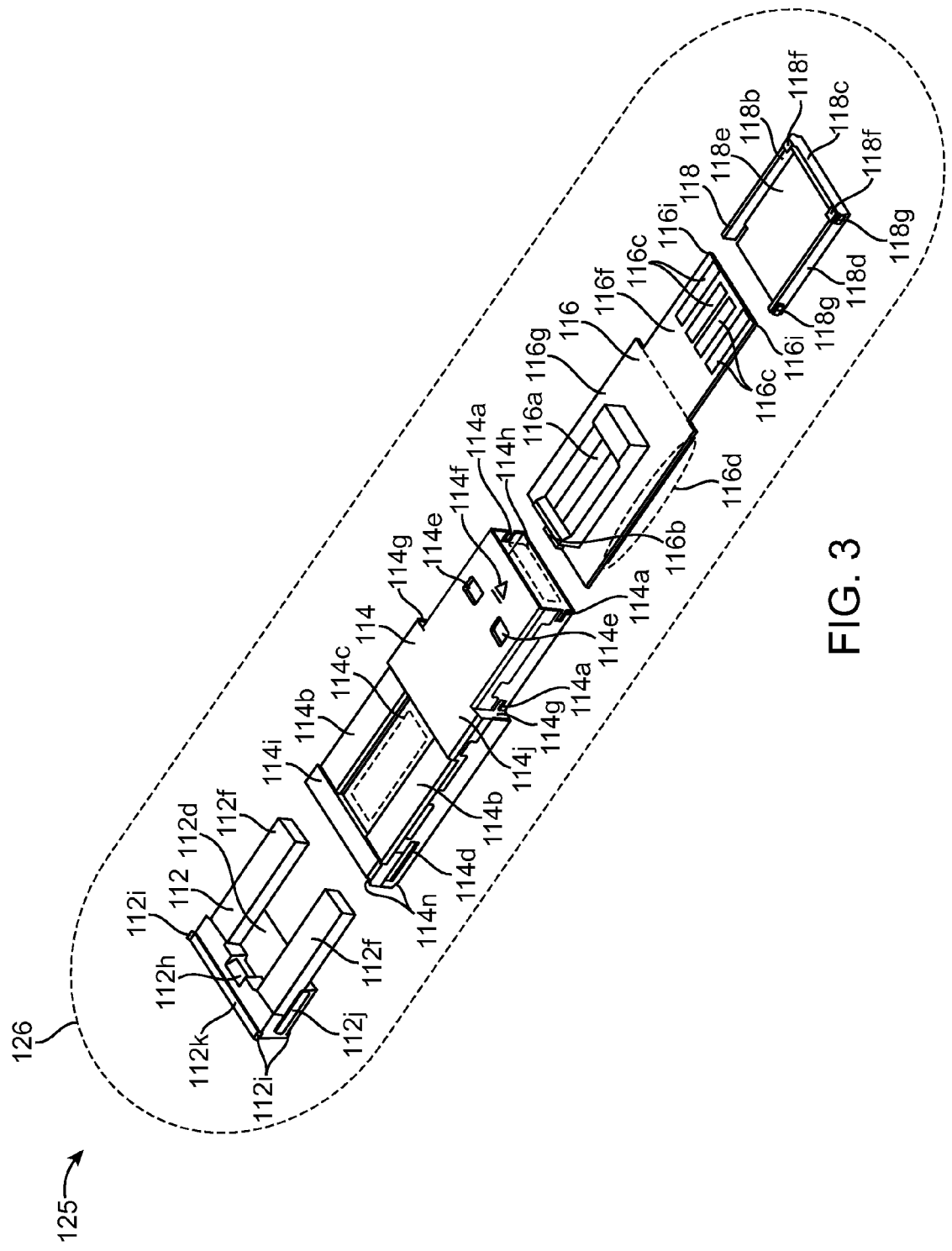
Figure 4:
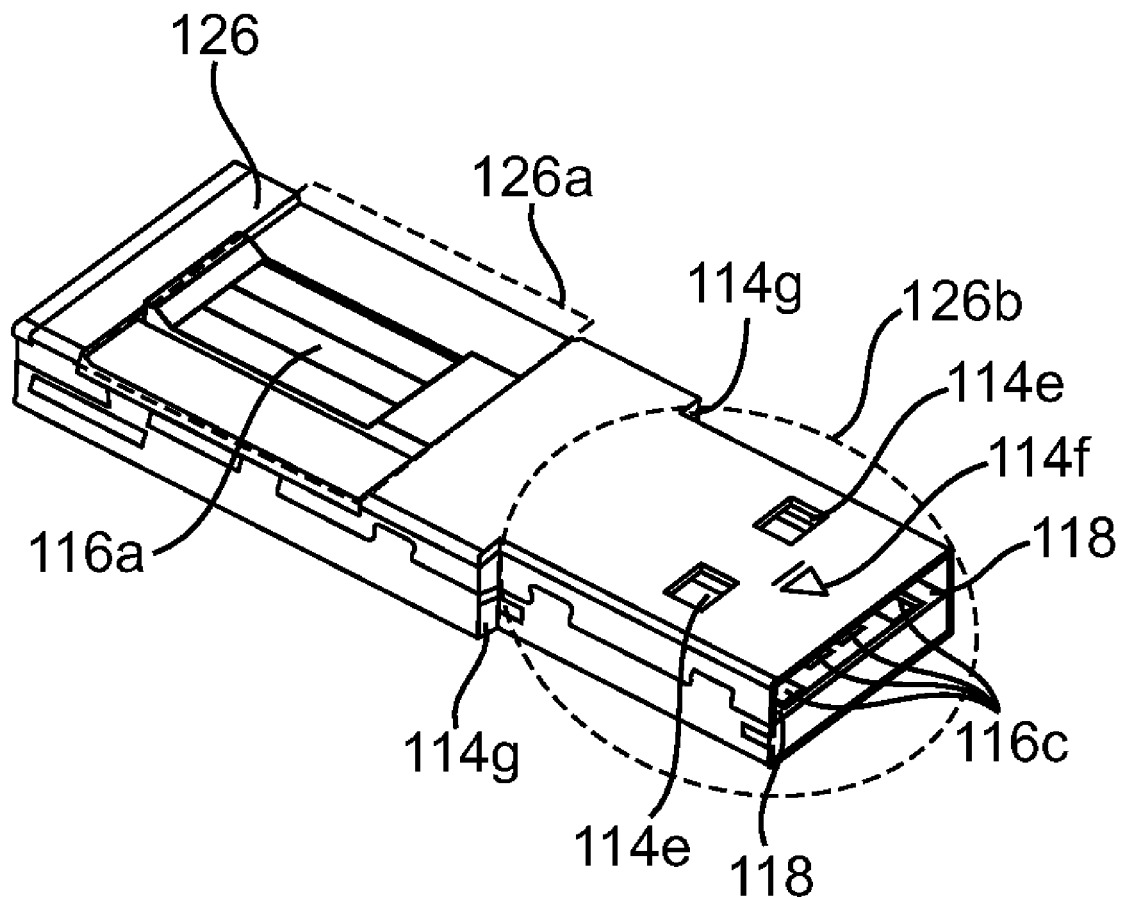
FIG. 4 shows a the slim USB device 126.

Referring now to FIGS. 3 and 4, an exploded view 125 and complete view 127 of the slim USB device 126 is shown in accordance with an embodiment of the present invention. The slim USB device 126 is shown to be comprised of a transparent plastic end-cap 112, a slim USB housing 114, a printed circuit board assembly (PCBA) with fingerprint sensor 116, and a PCBA support 118. When these devices are placed together they form the completed slim USB device 126.

The transparent plastic end-cap 112 is shown to include PCBA support shelf 112d, fingerprint sensor support bars 112f, LED gap 112h, guide tabs 112i, stop bar 112k, and snap tabs 112j. The PCBA support shelf 112d is used to support the PCBA with fingerprint sensor 116 from below while the fingerprint sensor support bars 112f flank the fingerprint sensor 116a to provide additional lateral support. The LED gap 112i is a space for the LED 116b to cast light through the transparent transparent plastic end-cap 112. The guide tabs 112i help align the transparent plastic end-cap 112 when inserted. The stop bar 112k prevents over-insertion. The snap tabs 112j prevent the transparent plastic end-cap from inadvertently falling out. In addition, while this view shows snap-tabs 112j only on one sides, a second snap tab 112j is disposed in the same position on the opposite side of the transparent plastic end-cap.

The slim USB housing 114 is shown and described in U.S. patent application Ser. No. 11/874,108, entitled "UNIVERSAL SERIAL BUS (USB) FLASH DRIVE HOUSING A SLIM USB DEVICE AND HAVING SWIVEL CAP FUNCTIONALITIES ALLOWING FOR TWO LOCKING POSITIONS", filed on Oct. 17, 2007, the disclosure of which is herein incorporated by reference as though set forth in full. The slim USB housing 114 is comprised of snap slots 114a, a recessed surface 114b, finger-print reader slot 114c, rear snap-slot 114d, USB interface slots 114e, insertion indicator 114f, stop shoulders 114g, a front-opening 114h, and rear guide-slots 114n, in accordance with an embodiment of the present invention. The recessed surfaces 114b are slightly lower than the rear top surface 114i and front top surface 114j. This slight recession allows the user of the 100 to more easily access the fingerprint reader, which is described later. Disposed near the front of the slim USB housing 114 are two USB interface slots 114e. These slots, in conformity with USB standards, help lock the 100 into place when coupled with a host device. An insertion indicator 114f is also disposed near the front of the slim USB housing 114. The insertion indication informs the user of the device how to insert 100 into a host-device.

The PCBA with fingerprint sensor is shown to include a fingerprint sensor 116a, an LED 116b, contact fingers 116c, a memory chip 116d, and front leading corners 116i in accordance with an embodiment of the present invention. While it is a single, physical piece, the PCBA with fingerprint sensor 116 has fore 116f and aft 116g portions which differ in width and are demarcated by the PCB shoulders 116h. The fingerprint sensor 116a is disposed along the aft portion 116g of the PCBA with fingerprint sensor 116. The fingerprint sensor 116a is a security device which reads a user's fingerprint and compares it to an exemplar stored on the PCBA before granting read and/or write access to the information stored in the memory chip 116d. The LED 116b is disposed immediately behind the fingerprint sensor and emits light when the device is being read from or written to. Four contact fingers 116c are disposed on the front portion 116f. The contact fingers 116c are positioned in conformity with USB standards. The contact fingers 116c align with corresponding contact pins in the host device and, when connected, transfer data to/from the host device and the 100.

The PCBA support 118 is shown to include lateral side 118b, leading lateral side 118c, lateral side 118d, floor 118e, PCBA stop-tabs 118f, and snap-tabs 118g in accordance with an embodiment of the present invention. Sides 118b, 118c, and 118d frame three sides of floor 118e, leaving opening 118h to allow the PCBA with fingerprint sensor 116 to slide into the PCBA support 118. PCBA stop-tabs 118f prevent PCBA misalignment during normal use. Snap-tabs 118g prevent the PCBA support 118 from falling out of the 100 during use.

During a step in the manufacturing process, the PCBA support 118 is inserted into the slim USB housing 114 whereupon snap-tabs 118g snap into snap-slots 114d, locking the PCBA support into place forming the slim USB housing with PCBA support 122. In a second step of the manufacturing process, the PCBA with fingerprint sensor 116 is inserted into the slim USB housing with PCBA support 122. The PCBA with fingerprint sensor 116 slides into the slim USB housing with PCBA support 122 so that front corners 116i are positioned underneath the PCB stop-tabs 118f while the fingerprint sensor 116a sticks through the fingerprint sensor slot 114c inbetween the two recessed surfaces 114b. In a third step in the manufacturing process, the transparent plastic end-cap 112 is inserted into the slim USB housing with PCBA 124. When the transparent plastic end-cap 112 is fully inserted into the slim USB housing with PCBA 124, the guide tabs 112i sit in the alignment slots 114n. The PCBA with fingerprint sensor 116 (now inserted) is supported on the back by the floor 112d of the transparent plastic end-cap 112. The fingerprint sensor 116a is supported laterally by the fingerprint sensor support bars 112f. Snap-tabs 112j snap into corresponding snap-slots 114d to prevent the transparent plastic end-cap from falling out.

Figure 5:
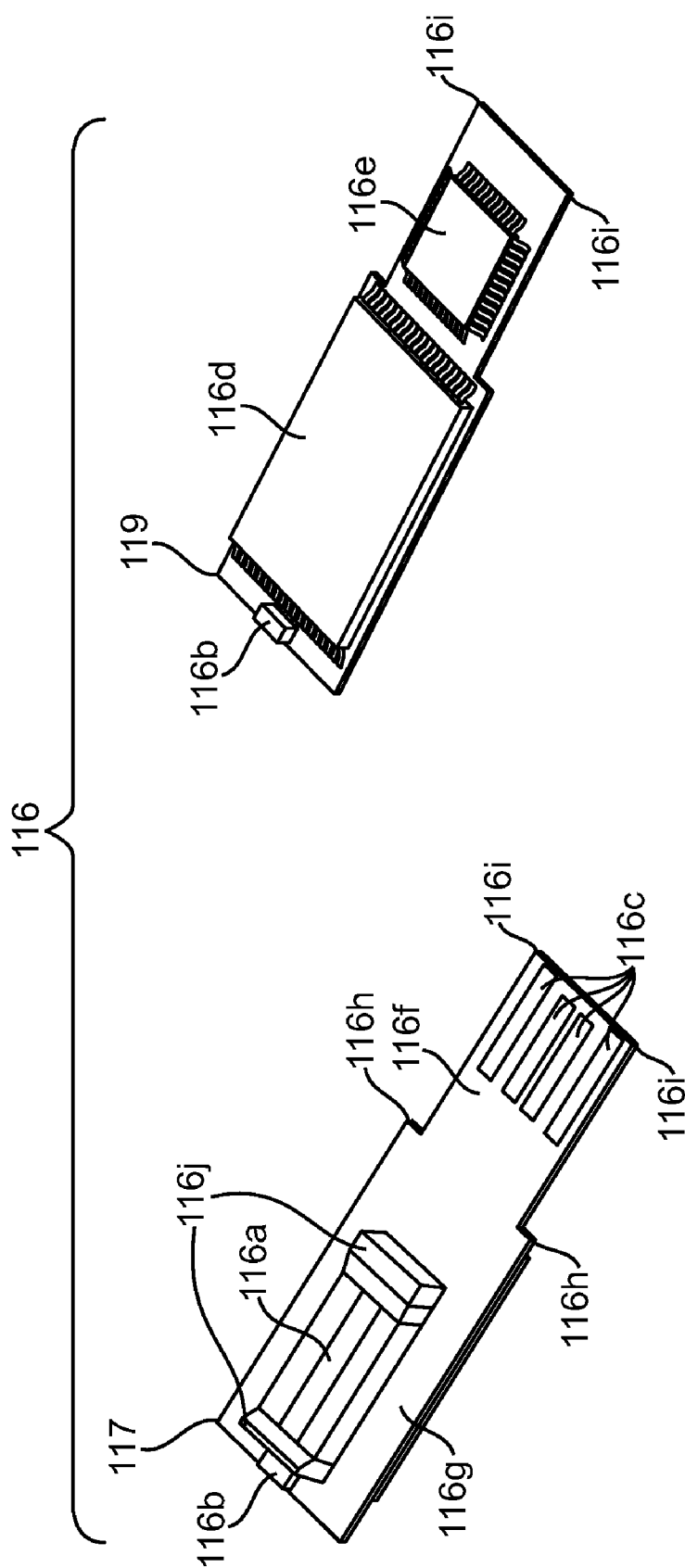
FIG. 5 shows a top and bottom view of the printed circuit board assembly (PCBA) 116.

Referring now to FIG. 5, a detailed view of the PCBA 116, showing a top-view 117 and bottom view 119 of the printed circuit board assembly (PCBA) 116, in accordance with an embodiment of the present invention. The top-view 117 of the PCBA with fingerprint sensor 116 is shown to include a fingerprint sensor 116a, an LED 116b, contact fingers 116c, a memory chip 116d, front leading corners 116i, and fingerprint sensor fits 116j in accordance with an embodiment of the present invention. While it is a single, physical piece, the PCBA with fingerprint sensor 116 has fore 116f and aft 116g portions which differ in width and are demarcated by PCB shoulders 116h. The fingerprint sensor 116a is disposed along the aft portion 116g of the PCBA with fingerprint sensor 116. The fingerprint sensor 116a is a security device which reads a user's fingerprint and compares it to an exemplar stored on the PCBA before granting read and/or write access to the information stored in the memory chip 116d. The LED 116b is disposed immediately behind the fingerprint sensor and emits light when the device is being read from or written to. Four contact fingers 116c are disposed on the front portion 116f in accordance with an embodiment of the present invention. The contact fingers are positioned in conformity with USB standards. When 100 is inserted into a host-device, the contact fingers 116c align with corresponding contact pins in the host device data transfer to/from the host device and the 100.

The LED 116b is disposed on the top 117 and bottom 119 sides aft portion 116g of the PCBA with fingerprint sensor and is disposed behind the memory chip 116d. The controller chip 116e is located on the fore portion 116f, bottom side 119 of the PCBA. The controller chip 116e controls the flow of data to and from the PCBA/fingerprint sensor 116 and the host device. The controller chip 116e is also responsible for controlling the fingerprint sensor 116a's security functions.

Figure 6:
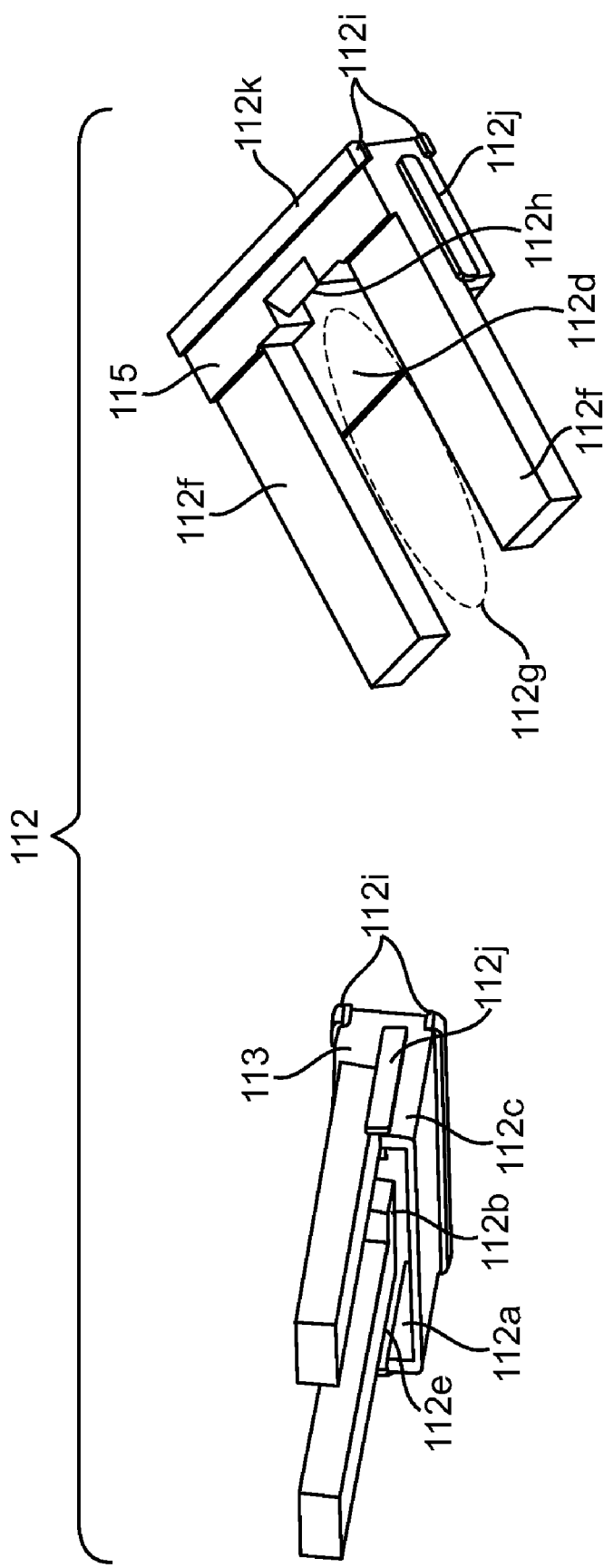
FIG. 6 shows a top and side view of the transparent plastic end-cap 112.

Referring now to FIG. 6, a more detailed view of the transparent plastic end-cap 112, showing a side view 113 and top view 115 in accordance with an embodiment of the present invention. The transparent plastic end-cap is shown to include lateral sides 112a, 112b, and 112c, floor 112d, PCBA grooves 112e, fingerprint sensor support bars 112f, gap for fingerprint sensor 112g, LED gap 112h, guide tabs 112i, stop-bar 112k, and snap-tabs 112j.

The support grooves 112e are disposed above lateral sides 112a and 112c and below fingerprint sensor supports bars 112f. In an exemplary application, the rear of PCBA with fingerprint sensor 116 fits into the support grooves 112f thereby stabilizing the PCBA with fingerprint sensor 116. The support groves 112e add lateral and torsional support and help prevent damage to the PCBA with fingerprint sensor 116. The fingerprint sensor support bars 112f give lateral support to the fingerprint sensor 116a on the PCBA with fingerprint sensor 116 helping to keep it in place when a user swipes his or her finger over the fingerprint sensor 116a. The LED gap 112h allows for the LED 116b to sit inside of it for the purposes of transmitting light that is visible to the user when the 100 is being read or written to. Guide-tabs 112i guide the transparent plastic end-cap into proper position when inserted into the slim USB housing 114 and fit into the rear guide-slots 114n on the slim USB housing 114. Stop-bar 112k prevents over-insertion. Snap-tab 112j prevents the transparent plastic end-cap from falling out during normal use.

Referring now to FIG. 7, which is shown to include the slim USB housing 114 and the PCB support piece 118, in accordance with an embodiment of the present invention. In an exemplary embodiment of the present invention, snap slots 114a are used to hold the PCB support piece 118 in place after the PCB support piece 118 is slid into the front opening 114h of the slim USB housing 114. Corresponding snap-tabs 118g snap into the snap slots 114a holding the PCB support piece 118 in place. Guide shoulders 114g act as stops, preventing the completed slim USB device from sliding past the lower housing lip 110g when placed into the plastic casing. Lateral side 118b, leading lateral side 118c, lateral side 118d, and floor 118e support the PCB when it is inserted into the slim USB housing. Stop-tabs 118f are disposed at the corner of lateral sides 118b and 118d and leading lateral side 118c. These tabs prevent the PCB from lifting up and becoming misaligned during normal use.

Referring now to FIG. 8, showing a step in the manufacturing process, the PCBA 116 and the slim USB housing with PCB support 122 are shown in accordance with an embodiment of the present invention. In this view, the PCBA 116 is shown to include the fingerprint sensor 116a, light emitting diode (LED) 116b, contact fingers 116c, and memory chip 116d.

During this step of the manufacturing process, the PCBA 116 is inserted into the slim USB housing with PCB support 122 to form slim USB housing with PCBA 124. After proper insertion, the front corners 116i of the PCBA 116 align themselves under the PCB stop-tabs 118f. In addition, the fingerprint sensor fits into the fingerprint sensor slot 114c.

Referring now to FIG. 9, showing a step in the manufacturing process where the transparent plastic end-cap 112 is inserted into the slim USB housing with PCBA inserted in accordance with an embodiment of the present invention. In this figure, the transparent plastic end-cap 112 is inserted until the snap tabs 112j snap into the rear snap-slots 114d and the stop-bar 112k is flush against the rear top surface 114i to form the slim USB device 126.

Referring now to FIG. 10, a top angular view 142 of the swivel cap 108 is shown and a top angular view 144 of the swivel cap 108 are shown in accordance with an embodiment of the present invention. The swivel cap 108 is shown to include four lock pins 108A; two pivot snap couplings 108B; swivel cap slot 108C; four USB connector spacer lips 108D; two fingerprint sensor area spacer lips 108E; closed semi-circular end cap 108F; open semi-circular end point 108G; top swivel cap face 108H; bottom swivel cap face 108I; and two USB connector gaps 108J. The swivel cap 108 is made of a transparent or translucent plastic material in an embodiment of the present invention.

As shown in the top angular view 142, the swivel cap 108 is generally in the shape of a rectangular box with a open semi-circular end point 108G and a closed semi-circular end cap 108F opposite each other. A swivel cap slot 108C traverses the length of the swivel cap 108 from the outer edge of the open semi-circular end point 108G to the interior edge of the closed semi-circular end cap 108F such that the swivel cap 108 has one open end and one closed end. The swivel cap slot 108C separates the top swivel cap face 108H from the bottom swivel cap face 108I such that the two components are joined by the closed semi-circular end cap 108F.

As shown in the top angular view 144, abutting the interior edge of the closed semi-circular end cap 108F, two USB connector spacer lips 108D protrude from the outer adjoining edges of the swivel cap slot 108C faces of both the top swivel cap face 108H and the bottom swivel cap face 108I. In one embodiment of the invention, the four USB connector spacer lips 108D are thin rectangular protuberances of a length along the exterior edge of the top swivel cap face 108H and bottom swivel cap face 108I generally equal to that of the USB connector 126B. The four USB connector spacer lips 108D create two USB connector gaps 108J through which the USB connector 126B of the USB device 130 may pass freely. Generally centered about the y-axis of the swivel cap 108, two fingerprint sensor area spacer lips 108E protrude from the opposing outer edges of the swivel cap slot 108C face of the top swivel cap face 108H. In one embodiment of the invention, the fingerprint sensor area spacer lips 108E are thin rectangular protuberances generally contoured to mirror the contour of the recessed area 102N, and they are of a length along the exterior edge of the top swivel cap face 108H substantially equal to that of the recessed area 102N. The two fingerprint sensor area spacer lips 108E obstruct access to the fingerprint sensor area 126A when the USB device 130 is swiveled into the swivel cap slot 108C.

As shown in the top angular view 144, on the swivel cap slot 108C facing of the bottom swivel cap face 108I and generally centered on the open semi-circular end point 108G, two lock pins 108A protrude from the bottom swivel cap face 108I aligned along the y-axis, with a pivot snap coupling 108B protruding generally equidistantly from the bottom swivel cap face 108I between the two lock pins 108A. On the swivel cap slot 108C facing of the top swivel cap face 108H and generally centered on the open semi-circular end point 108G, two lock pins 108A protrude from the top swivel cap face 108H aligned along the y-axis, with a pivot snap coupling 108B protruding generally equidistantly from the top swivel cap face 108H between the two lock pins 108A. In one embodiment of the invention, the lock pins 108A are cylindrical projections of a height generally equal to that of the distance between the snap coupling lip 106J and the pivot block dorsal face 106I. The pivot snap coupling is a cylindrical projection bisected about the x-axis, with a tapered flange circumscribing the top of the projection.

The swivel cap 108 is formed from a transparent or translucent plastic material so as to allow the light emanating from the pivot block aperture 110D and pivot block aperture 102D to remain visible. The swivel cap 108 protects the USB device 130 from physical damage by enshrouding the USB device 130 within the swivel cap slot 108C when the USB flash drive with locking swivel cap 132 is in the closed position. The swivel cap 108 connects permanently for normal use to the USB device 130 via the two pivot snap couplings 108B, preventing the swivel cap 108 from being misplaced. The pivot snap couplings 108B permit the USB device 130 to rotate axially about the pivot snap couplings 108B once they are connected to the two pivot block snap couplings 106E of the USB device 130. The lock pins 108A rest within the pivot block aperture 110D and pivot block aperture 102D such that when the swivel cap 108 is rotated to the 0 or 180 degree position about the y-axis, the lock pins 108A couple with the lock groove snap couplings 102E and the lock groove snap couplings 110E to lock the USB flash drive with locking swivel cap 132 into the closed or open position. In the closed position, the USB connector spacer lips 108D and the fingerprint sensor area spacer lips 108E occlude the resultant gaps in the lateral sides of the USB flash drive with locking swivel cap 132 when it is in the closed position.

Referring now to FIG. 11, a top angular view 106F of the pivot block 106 and a bottom angular view 106G of the pivot block 106 are shown in accordance with one embodiment of the present invention. The pivot block 106 is shown to include three pivot block end stops 106A; a pivot block slope 106B; pivot block fitting edge 106C; pivot block ventral face 106D; pivot block snap coupling 106E; snap coupling aperture 106H; pivot block dorsal face 106I; and a snap coupling lip 106J. The pivot block 106 is made of a transparent or translucent plastic material in an embodiment of the present invention.

In the top angular view 106F, the pivot block 106 is shown generally to be cylindrical in shape with three cube shaped pivot block end stops 106A protruding from the lateral face of the pivot block 106. Two of the end stops 106A are positioned on the lateral face of the pivot block 106 opposite each other, and one end stop 106A is position on the lateral face of the pivot block 106 opposite the rectangularly shaped fitting edge 106C, which is shown as a flattened and slightly protruding rectangular area on the lateral face of the pivot block 106. Protruding from the dorsal face 106I of the pivot block 106 is the pivot block snap coupling 106E. The pivot block snap coupling 106E is a cylindrical shaped protuberance from the dorsal face 106I consisting of a snap coupling lip 106J and a snap coupling aperture 106H. The snap coupling lip 106J is a lip generally protruding inward relative to the snap coupling aperture 106H toward the snap coupling aperture 106H from the cylindrical body of the pivot block snap coupling 106E where the diameter of the snap coupling aperture 106H is generally smaller than the inner diameter of the pivot block snap coupling 106E. The snap coupling aperture 106H is a circle-shaped opening cut out from the same end of the pivot block snap coupling 106E as the snap coupling lip 106J.

In the bottom angular view 106G, a pivot block slope 106B is shown on the bottom side of the pivot block 106. The pivot block slope 106B is centered about the pivot block snap coupling 106E, with an inner diameter equal to that of the pivot block snap coupling 106E and an outer diameter being less than that of the outer diameter of the pivot block 106. A concave slope angling downward from the outer diameter of the pivot block slope 106B to the inner diameter of the pivot block slope 106B. In some embodiments of the invention, the angle of the slope in the pivot block slope 106B may be generally shallow or generally steep. The pivot block ventral face 106D is the bottom face of the pivot block 106 generally shaped as a ring with the inner diameter equal to and adjoining the outer diameter of the pivot block slope 106B and an outer diameter equal in size and dimension of the pivot block 106. In one embodiment of the invention, the pivot block ventral face 106D is flat and smooth.

The pivot blocks 106 serve to connect the swivel cap 108 to the USB device 130 via the connection of the pivot block snap couplings 106E and the pivot snap couplings 108B. The placement of the three pivot block end stops 106A and the pivot block fitting edge 106C prevent the pivot blocks 106 from rotating within the USB device 130 when the swivel cap 108 is rotated. The pivot blocks 106 also serve to transmit light from the transparent plastic end-cap 112 in order to signal that the USB device 130 is powered, as well as when data transfer is occurring.

Referring now to FIG. 12 a top angular view of the lower housing 110 is shown, in accordance with an embodiment of the present invention. The lower housing 110 is shown to include nine snap coupling slots 110A; lower housing channel 110B; USB connector opening 110C; pivot block aperture 110D, two lock groove snap couplings 110E; semi-circular shaped end 110F; and a lower housing lip 110G. The lower housing 110 is made of plastic in an embodiment of the present invention.

The lower housing 110 is generally shaped as a partially rectangular box with a USB connector opening 110C at one end and a semi-circular shaped end 110F opposite the connector opening, bounded by the lip 110G. The USB connector opening 110C is rectangularly shaped and of a width less than the width of the front end of the lower housing 110, with both end points of the opening 110C terminating at an interior face of the lower housing lip 110G. The lower housing 110 is hollowed by a channel 110B, with the boundaries of the lower housing 110 elevated above the channel 110B to form a lip 110G. The lip 110G extends from one edge of the USB connector opening 110C around the boundaries of the lower housing 110 to the opposite edge of the USB connector opening 110C. A plurality of snap coupling slots 110A exist on the interior facing edge of the lip 110G. A circular shaped pivot block aperture 110D is in the channel 110B near the semi-circular shaped end 110F, where two opposing lock groove snap couplings 110E protrude from the interior edge of the pivot block aperture 110D. The lock groove snap couplings 110E generally point inward relative to the pivot block aperture 110D at an angle that is substantially 0 and 180 degrees about the y-axis.

During assembly of the USB device 130, the lower housing 110 and the upper housing 102 are snapped together, thereby encasing the slim USB device 126 from its rearward end to the base of the USB connector 126B, and two pivot blocks 106. The pivot block aperture 110D permits the pivot block snap coupling 106E to connect to the pivot snap coupling 108B. The pivot block aperture 110D also permits the lock pins 108A to rest within the pivot block aperture 110D, as well as to snap into the lock groove snap couplings 110E.

Referring now to FIG. 13, a bottom angular view 102K of the upper housing 102 and a top angular view 102L of the upper housing 102 are shown in accordance with one embodiment of the present invention. The upper housing 102 is shown to include nine snap coupling tabs 102A; fingerprint sensor area opening 102B; two fingerprint sensor bar slots 102C; pivot block aperture 102D; two lock groove snap couplings 102E; USB connector opening 102F; upper housing channel 102G; upper housing semi-circular shaped end 102H; upper housing lip 102I; four fingerprint sensor bounding blocks 102J; outer surface 102M; and a recessed area 102N. The upper housing 102 is made of plastic in an embodiment of the present invention.

In the bottom angular view 102L, the upper housing 102 is generally shaped as a partially rectangular box with a USB connector opening 102F at one end and a semi-circular shaped end 102H opposite the connector opening, bounded by an upper housing lip 102I. The USB connector opening 102F is rectangularly shaped and of a width less than the width of the front end of the upper housing 102, with both end points of the USB connector opening 102F terminating at an interior face of the upper housing lip 102I. The upper housing 102 is hollowed by a channel 102G, with the boundaries of the upper housing 102 elevated above the channel 102G to form a lip 102I. The lip 102I extends from one edge of the USB connector opening 102F around the boundaries of the upper housing 102 to the opposite edge of the USB connector opening 102F. A plurality of snap coupling tabs 102A protrude upward from the top facing edge of the lip 102I. A circular shaped pivot block aperture 102D is cut into the channel 102G near the semi-circular shaped end 102H. The pivot block aperture 102D has two opposing lock groove snap couplings 102E protruding from the interior edge of the pivot block aperture 102D. The lock groove snap couplings 102E generally point inward relative to the pivot block aperture 102D at an angle that is substantially 0 and 180 degrees about the y-axis.

A rectangular-shaped fingerprint sensor area opening 102B is cut into the upper housing channel 102G generally near the middle of the upper housing 102. The fingerprint sensor area opening 102B spans from the interior facing of the upper housing lip 102I on one side of the upper housing 102 to the other interior facing of the upper housing lip 102I on the other side. A fingerprint sensor bounding block 102J protrudes upward from the channel 102G and inward from the lip 102I at each corner of the opening 102B. The fingerprint sensor bounding blocks 102J create fingerprint sensor bar slots 102C in the space between each pair of fingerprint sensor bounding blocks 102J on both sides of the fingerprint sensor area opening 102B. In one embodiment of the invention, the width of the fingerprint sensor bar slots 102C correspond to the lateral dimension of the fingerprint sensor fits 116J.

In the top angular view 102L of the upper housing 102, a recessed area 102N surrounding the fingerprint sensor area opening 102B is shown on the outer surface 102M of the upper housing 102. The recessed area 102N surrounds the fingerprint sensor area opening 102B and is generally shaped as a flat impression, with the forward and rearward facing edges of the recessed area 102B consisting of the fingerprint sensor bounding blocks 102J and the fingerprint sensor bar slots 102C.

During assembly of the USB device 130, the lower housing 110 and the upper housing 102 are snapped together, thereby encasing the slim USB device 126 from its rearward end to the base of the USB connector 126B, and two pivot blocks 106. The pivot block aperture 110D permits the pivot block snap coupling 106E to connect to the pivot snap coupling 108B. The pivot block aperture 110D also permits the lock pins 108A to rest within the pivot block aperture 110D, as well as to snap into the lock groove snap couplings 110E. The fingerprint sensor area opening 102B serves to provide access to fingerprint sensor area 126A, with the contoured design of the recessed area 102N aiding passage of a finger past the fingerprint sensor area 126A.

In an alternative embodiment of the invention, the fingerprint sensor area 126A is not present on the slim USB device 126. In this embodiment, the fingerprint sensor area opening 102B, fingerprint sensor bar slots 102C, fingerprint sensor bounding blocks 102J, and recessed area 102N are not present on the upper housing 102.

Referring now to FIG. 14, a top angular view of the partial USB device assembly 128 is shown formed by placing the slim USB device 126 and a pivot block 106 into the lower housing 110 as step 4 used in the manufacturing process of the DEVICE NAME in accordance with a method of the present invention.

As shown in FIG. 14, the slim USB device 126 is placed into the lower housing channel 110B of the lower housing 110 with the USB connector 126B protruding through the USB connector opening 110C and with the finger print sensor area 126A facing away from the bottom of the lower housing 110. The slim USB device 126 is placed into the lower housing channel 110B such that the guide shoulders 114G abut the interior edge of the lower housing lip 110G on both sides of the USB connector opening 110C. The lateral sides of the slim USB device 128 abut the interior facing edge of the lower housing lip 110G with little to no clearance so as to create a substantially tight friction fit. A pivot block 106 is placed into the lower housing channel 110B of the lower housing 110 in the semi-circular protuberance 110F with the pivot block snap coupling 106E protruding generally through the center of the pivot block aperture 110D of the lower housing 110. The pivot block 106 is oriented such that the pivot block end stops 106A align with the snap coupling slots 110A in the lower housing lip 110G circumscribing the semi-circular protuberance 110F. The pivot block fitting edge 106C of the pivot block 106 adjoins the rear end of the transparent plastic endcap 112 with little to no clearance so as to create a substantially tight friction fit.

While an exemplary method of assembling the partial USB device assembly 128 is shown and described, other methods are contemplated, such as performing certain steps in a different order.

Referring now to FIG. 15, a top angular view of the USB Device 130 assembly is shown formed by placing a pivot block 106 into the partial USB device assembly 128 and connecting the upper housing 102 to the lower housing 110 as step 5 used in the manufacturing process of the USB flash drive with locking swivel cap 132 in accordance with a method of the present invention.

As shown in FIG. 15, a pivot block 106 is placed on top of the pivot block 106 in the partial USB device assembly 128 such that the pivot block ventral faces 106D of the two pivot blocks 106 are in substantially full and direct contact, and both pivot blocks 106 are oriented in the same direction. The upper housing 102 is connected to the lower housing 110 of the partial USB device assembly 128 with the USB connector 126B protruding through the USB connector opening 102F, and with the fingerprint sensor area 126A aligned with the fingerprint sensor area opening 102B. When properly aligned, the pivot block snap coupling 106E of the pivot block 106 placed in this step will protrude generally from the center of the pivot block aperture 102D, and the upper housing snap coupling tabs 102A will align with the lower housing snap coupling slots 110A. The snap coupling tabs 102A snap into the snap coupling alots 110A, firmly encasing the slim USB device 126 and the two pivot blocks 106 within the lower housing 110 and the upper housing 102. Additionally, the fingerprint sensor fits 116J will fully obstruct the fingerprint sensor bar slots 102C upon connection of the upper housing 102 to the lower housing 110, creating a substantially uniform surface in the recessed area 102N. The fingerprint sensor bar 116A protrudes from the fingerprint sensor area opening 102B in the formed USB device assembly 130.

While an exemplary method of assembling the USB device 130 is shown and described, other methods are contemplated, such as performing certain steps in a different order.

Referring now to FIG. 16, a top angular view of the USB flash drive with locking swivel cap 132 is shown formed by affixing the sliding the swivel cap 108 onto the USB device 130 as step 6 used in the manufacturing process of the DEVICE NAME in accordance with a method of the present invention.

As shown in FIG. 16, the USB flash drive with locking swivel cap 132 is formed by sliding the swivel cap 108 onto the USB device 130 such that the pivot snap couplings 108B of the swivel cap 108 and the pivot block snap couplings 106E of the USB device 130 snap into each other. After the USB flash drive with locking swivel cap 132 is formed, the swivel cap 108 rotates axially about the pivot snap couplings 108B. The lock pins 108A rotate within the pivot block aperture 110D and pivot block aperture 102D, where the lock pins 108A lock into the lock groove snap couplings 102E and the lock groove snap couplings 110E at both the 180 degree ("open position") and 0 degree ("closed position") positions about the y-axis. That is, the lock pins 108A snapping into the lock groove snap couplings 102E and the lock groove snap couplings 110E when the swivel cap 108 is rotated serve to lock the USB flash drive with locking swivel cap 132 in the open or closed position. When the USB flash drive with locking swivel cap 132 is locked in the closed position, the USB device 130 is fully enclosed within the swivel cap 108. When the USB flash drive with locking swivel cap 132 is locked in the open position, the USB connector 126B and the fingerprint sensor area 126A are fully exposed for operation.

Referring now to FIG. 17, a USB storage device with one-way swiveling cap 200 is shown to include a USB connector 200a, an insertion indicator 200b, USB interface slots 200c, lower plastic housing 200d, upper plastic housing 200e, an LED 200f, a pivot 200g, a clear plastic swivel cap 200h, a lanyard hole 200i, and an opening in the plastic swivel cap 200j in accordance with an embodiment of the present invention.

The USB connector 200a is built in conformity with USB standards and allows the USB storage device with one-way swiveling cap 200 to be inserted into and interact with a host device. Insertion indicator 200b instructs the user on how to insert the USB storage device with one-way swiveling cap 200. USB interface slots 200c prevent the USB storage device with one-way swiveling cap 200 from becoming inadvertently dislodged. Lower plastic housing 200d and upper plastic housing 200e protect the internals, which are substantially similar to those described earlier. The internals are not further discussed to avoid duplicative description. LED light 200f is used to indicate power to the device and to inform the user when data is being read from or written to the device. The pivot 200g allows the rotatably attached swivel cap 200h with opening 200k to swivel in a substantially 180 degree arc along the Y axis. In an open position, the USB storage device with one-way swiveling cap 200 may be inserted into a host device. In a closed position, the USB storage device with one-way swiveling cap is enclosed in the swivel cap 200h and thereby protected from damage. The plastic swivel cap has two molded ridges 200j that fit around the USB connector 200a. The molded ridges 200j provide a more snug fit and better protect the USB connector 200a from damage. The swivel cap 200h also has a molded hole 200i allowing the user to, for example, attach a lanyard.

What is claimed is:

1. A Universal Serial Bus (USB) flash drive with locking swivel cap comprising:
   a USB device;
   a swivel cap having a top swivel cap face and a bottom swivel cap face,
   the swivel cap connectably attached to the USB device;
   four locking pins, two of which disposed on the top swivel cap face and two of which disposed on the bottom swivel cap face;
   two top locking grooves disposed on a top surface of the USB device;

two bottom locking grooves disposed on a bottom surface of the USB device, wherein the locking pins disposed on top swivel cap face couple with the two top locking grooves and the locking pins disposed on the bottom swivel cap face couple with the two bottom locking grooves allowing the swivel cap to lock in an open and closed positions;

a USB connector connected to the USB device to couple said USB flash drive to a host device;

wherein the PCBA has fore and aft portions and top and bottom sides, the USB flash drive with locking swivel cap further comprising, a fingerprint sensor disposed on the aft portion, top side of the PCBA;

four USB contact fingers disposed on the fore portion, top-side of the PCBA;

a controller chip disposed on the fore portion, bottom side of the PCBA;

a memory chip disposed on the aft portion, bottom side of the PCBA; and a light emitting diode (LED) disposed on the aft portion, top side of the PCBA behind the fingerprint sensor and aft portion, bottom sides of the PCBA behind the memory chip; and a fingerprint sensor area disposed on the top side of the USB device, said fingerprint sensor operative to scan fingerprints of a user of the portable flash drive with swivel cap and optional fingerprint verification capability, and allowing access to data stored on the portable flash drive with swivel cap and optional fingerprint verification capability.

2. A USB flash drive with locking swivel cap, as recited in claim 1, further including a slim USB device comprised of:
a slim USB housing having a front and a back;
a printed circuit board assembly (PCBA) configured to fit inside the slim USB housing;
a PCBA support configured to snap inside the front of the slim USB housing, and
a transparent plastic end-cap configured to snap into the back of the slim USB housing,
wherein the slim USB housing is configured to house the PCBA, the PCBA support, and transparent plastic end-cap.

3. A Universal Serial Bus (USB) flash drive with locking swivel cap, as recited in claim 2, wherein the USB flash drive with locking swivel cap is in conformance with USB standards.

4. A Universal Serial Bus (USB) flash drive with locking swivel cap, as recited in claim 2, comprising a transparent plastic end-cap positioned to keep the PCBA from becoming misaligned and to allow light from the LED on the PCBA to pass through.

5. A USB flash drive with locking swivel cap, as recited in claim 1, further including upper and lower transparent, plastic swivel blocks configured to allow light from the LED to pass through the upper and lower transparent, plastic swivel blocks and further configured to allow the locking swivel cap to connect thereto.

6. A method manufacturing the Universal Serial Bus (USB) flash drive with locking swivel cap comprising:
inserting a printed circuit board assembly (PCBA) support into a slim USB housing forming a slim USB housing with PCBA support;
inserting the PCBA into a slim USB housing with PCBA support to form a slim USB housing with PCBA;
inserting a transparent end-cap into the slim USB housing with PCBA to form a slim USB device;
placing the slim USB device and a lower transparent pivot block into a lower housing;
placing an upper transparent end-block into the lower housing and snapping the upper housing to the lower housing forming the USB device;
connecting the plastic swivel-cap to the USB device; and
wherein the PCBA has fore and aft portions and top and bottom sides, the USB flash drive with locking swivel cap further comprising,
a fingerprint sensor disposed on the aft portion, top side of the PCBA,
four USB contact fingers disposed on the fore portion, top-side of the PCBA,
a controller chip disposed on the fore portion, bottom side of the PCBA;
a memory chip disposed on the aft portion, bottom side of the PCBA, and
a light emitting diode (LED) disposed on the aft portion, top side of the PCBA behind the fingerprint sensor and aft portion, bottom sides of the PCBA behind the memory chip.

7. A method manufacturing the Universal Serial Bus (USB) flash drive with locking swivel cap as recited in claim 6, where further, maintaining in place, the PCBA support inside the slim USB housing by four locking tabs.

8. A method manufacturing the Universal Serial Bus (USB) flash drive with locking swivel cap as recited in claim 6 by inserting the PCBA into the slim USB housing with PCBA support to form the slim USB housing with PCBA.

9. A method manufacturing the Universal Serial Bus (USB) flash drive with locking swivel cap as recited in claim 6 where further, maintaining in place the transparent plastic end-cap inside the slim USB housing with PCBA by two locking tabs.

10. A method manufacturing the Universal Serial Bus (USB) flash drive with locking swivel cap as recited in claim 6 where the slim USB device is placed into the lower housing along with the lower pivot block.

11. A method manufacturing the Universal Serial Bus (USB) flash drive with locking swivel cap as recited in claim 6 where the upper pivot block is placed directly on top of the lower pivot block and the upper housing is snapped into the lower housing forming the USB flash drive with locking swivel cap.

12. A method manufacturing the Universal Serial Bus (USB) flash drive with locking swivel cap as recited in claim 6 where the locking swivel cap is removably connected to the USB device in order to form the USB device with locking swivel cap.

13. A USB flash drive with locking swivel cap, as recited in claim 1, wherein the top two locking pins rest within a pivot block aperature, the USB flash drive further having a pivot block aperture having an interior face where two lock groove snap couplings protrude, and lock groove snap couplings generally protruding inward relative to the pivot block aperture at an angle that is substantially 0 and 180 degrees about the y-axis, the two top lock pins resting within the pivot block aperture, two lock groove snap couplings protruding on the interior face of the pivot block aperture, the lock groove snap couplings generally protruding inward relative to the pivot block aperture at an angle that is substantially 0 and 180 degrees about the y-axis.

* * * * *